(12) United States Patent
Little et al.

(10) Patent No.: US 7,475,293 B1
(45) Date of Patent: Jan. 6, 2009

(54) PRODUCT CHECK MATRIX

(75) Inventors: Mike E. Little, Cedar Park, TX (US); Rex G. Martin, Plano, TX (US); Matthew J. Helgren, Austin, TX (US); Paris E. Bingham, Jr., Aurora, CO (US); Alan J. Treece, St. Peters, MO (US)

(73) Assignee: Sun Microsystems, Inc., Santa Clara, CA (US)

( * ) Notice: Subject to any disclaimer, the term of this patent is extended or adjusted under 35 U.S.C. 154(b) by 612 days.

(21) Appl. No.: 10/691,894

(22) Filed: Oct. 23, 2003

Related U.S. Application Data

(63) Continuation-in-part of application No. 10/135,483, filed on Apr. 30, 2002, now Pat. No. 7,051,243, and a continuation-in-part of application No. 09/917,597, filed on Jul. 27, 2001, now Pat. No. 6,678,639, application No. 10/691,894, and a continuation-in-part of application No. 10/318,702, filed on Dec. 13, 2002.

(60) Provisional application No. 60/223,400, filed on Aug. 4, 2000.

(51) Int. Cl.
*G06F 11/00* (2006.01)
(52) U.S. Cl. .............................. 714/48; 714/26; 717/168
(58) Field of Classification Search .................. None
See application file for complete search history.

(56) References Cited

U.S. PATENT DOCUMENTS 4,447,846 A    5/1984   McCleery
4,853,873 A    8/1989   Tsuji et al.
5,111,384 A    5/1992   Aslanian et al.
5,175,800 A    12/1992  Galis et al.

(Continued)

FOREIGN PATENT DOCUMENTS

EP            367 377             5/1990

(Continued)

OTHER PUBLICATIONS

Patwardhan, et al., "Perl in a Nutshell," O'Reilly, Dec. 1998, ISBN: 1-56592-286-7, 1 page.

(Continued)

*Primary Examiner*—Yolanda L Wilson
(74) *Attorney, Agent, or Firm*—Robert C. Kowert; Meyertons, Hood, Kivlin, Kowert & Goetzel, P.C.

(57) ABSTRACT

A knowledge automation engine used to detect product issues on products. A knowledge automation engine may evaluate a check against one or more facts to detect a product issue. Facts used by the knowledge automation engine may include product configuration facts. A check may include one or more rules and reference one or more product check matrixes of facts, such as, but not limited to, identifiers for product packages and patches to be used by a check. As packages and/or patches become available for a product, they may be added to a product check matrix for the product. The packages and patches may be added to the database using predefined associations. The check may use the product check matrix to update packages and/or patches (including adding new packages/patches and removing old packages/patches) on a product accessible by the knowledge automation engine.

34 Claims, 20 Drawing Sheets

U.S. PATENT DOCUMENTS

| | | | |
|---|---|---|---|
| 5,179,695 A | 1/1993 | Derr et al. | |
| 5,287,505 A | 2/1994 | Calvert et al. | |
| 5,335,341 A | 8/1994 | Chana | |
| 5,664,093 A | 9/1997 | Barnett et al. | |
| 5,678,002 A | 10/1997 | Fawcett et al. | |
| 5,752,031 A | 5/1998 | Cutler et al. | |
| 5,826,250 A | 10/1998 | Trefler | |
| 5,862,322 A | 1/1999 | Anglin et al. | |
| 5,867,714 A | 2/1999 | Todd et al. | |
| 5,897,630 A | 4/1999 | Schneider et al. | |
| 5,922,079 A | 7/1999 | Booth et al. | |
| 5,944,839 A | 8/1999 | Isenberg | |
| 5,960,170 A | 9/1999 | Chen et al. | |
| 5,974,568 A | 10/1999 | McQueen | |
| 5,991,728 A | 11/1999 | DeBusk et al. | |
| 6,029,258 A | 2/2000 | Ahmad | |
| 6,055,513 A | 4/2000 | Katz et al. | |
| 6,170,065 B1 * | 1/2001 | Kobata et al. | 714/7 |
| 6,219,626 B1 | 4/2001 | Steinmetz et al. | |
| 6,298,308 B1 | 10/2001 | Reid et al. | |
| 6,347,312 B1 | 2/2002 | Byrne et al. | |
| 6,434,744 B1 * | 8/2002 | Chamberlain et al. | 717/168 |
| 6,487,677 B1 | 11/2002 | Jantz et al. | |
| 6,510,552 B1 * | 1/2003 | Benayoun et al. | 717/170 |
| 6,529,954 B1 | 3/2003 | Cookmeyer et al. | |
| 6,532,408 B1 | 3/2003 | Breed | |
| 6,549,893 B1 | 4/2003 | Lannert et al. | |
| 6,560,592 B1 | 5/2003 | Reid et al. | |
| 6,564,369 B1 | 5/2003 | Hove et al. | |
| 6,604,141 B1 | 8/2003 | Ventura | |
| 6,615,172 B1 | 9/2003 | Bennett et al. | |
| 6,629,267 B1 | 9/2003 | Glerum et al. | |
| 6,633,782 B1 | 10/2003 | Schleiss et al. | |
| 6,633,876 B1 | 10/2003 | Heatlie | |
| 6,678,639 B2 | 1/2004 | Little et al. | |
| 6,681,348 B1 | 1/2004 | Vachon | |
| 6,687,729 B1 | 2/2004 | Sievert et al. | |
| 6,701,514 B1 | 3/2004 | Haswell et al. | |
| 6,738,928 B1 | 5/2004 | Brown | |
| 6,738,932 B1 | 5/2004 | Price | |
| 6,741,975 B1 | 5/2004 | Nakisa et al. | |
| 6,742,141 B1 * | 5/2004 | Miller | 714/26 |
| 6,751,794 B1 * | 6/2004 | McCaleb et al. | 717/168 |
| 6,823,515 B2 | 11/2004 | Livecchi | |
| 6,859,893 B2 | 2/2005 | Hines | |
| 6,941,379 B1 | 9/2005 | Dingsor et al. | |
| 7,100,083 B2 | 8/2006 | Little et al. | |
| 7,146,535 B2 | 12/2006 | Little et al. | |
| 7,146,536 B2 | 12/2006 | Bingham, Jr. et al. | |
| 7,171,660 B2 * | 1/2007 | McCaleb et al. | 717/171 |
| 2002/0078404 A1 | 6/2002 | Vachon et al. | |
| 2002/0095615 A1 | 7/2002 | Hastings et al. | |
| 2003/0028825 A1 | 2/2003 | Hines | |
| 2003/0028857 A1 | 2/2003 | Zagorski et al. | |
| 2004/0078726 A1 | 4/2004 | Little et al. | |

FOREIGN PATENT DOCUMENTS

| | | |
|---|---|---|
| GB | 2 383 854 | 7/2003 |

OTHER PUBLICATIONS

Steve Oualline, "Practical C Programming," 3rd Edition, O'Reilly, Aug. 1997, ISBN: 1-56592-306-5, 3 pages.

Pittelli, et al., "Reliable Scheduling in a TMR Databse System," ACM, Feb. 1999, 2 pages.

"XML—The Benefits," Version found via "The Way Back Machine," Feb. 26, 2000, http://www.softwareag.com/xml/about/xml_ben.html, 3 pages.

Janice Winsor, "Solaris 8 System Administrator's Reference," Prentice Hall PTR, Sep. 7, 2000, ISBN: 0-13-027701-0, 2 pages.

Paul McFedries, "Windows 98 Unleashed," Sams Publishing, Mar. 12, 1998, ISBN: 0-672-31235-2, 4 pages.

"RS232 Interface: A Tutorial," Version from Oct. 4, 1999 found via "The Way Back Machine," http://arcelect.com/rs232.html, 2 pages.

"How Does Human Memory Compare with Computer Memory," Version from Nov. 11, 1999 found via "The Way Back Machine," http://www.scism.sbu.ac.uk/inmandw/tutorials/memory/qu8.htm, 4 pages.

Alligator Descartes, et al., "Programming the Perl DBI," O'Reilly and Associates, Feb. 2000, ISBN: 1-56592-699-4, 2 pages.

Michael Caplinger, "Graphical Database Browsing," ACM, 1986. 0-89791-210-1/86/1000-0113, 1 page.

James Kavicky, et al., "An Expert System for Diagnosing and Maintaining the AT&T 3B4000 Computer: An Architecture Description," ACM, Jun. 1989, pp. 36-45.

Rob McGregor, "Practical C++," Que, Aug. 11, 1999, ISBN: 0-7897-2144-9, 5 pages.

"UC Berkeley Library Internet Glossary," http://www.lib/berkeley.edu/TeachingLib/Guides/Internet/Glossary.html, Jun. 7, 1997, Version via WayBack Machine (http://www.archive.org), 3 pages.

Service Pack Manager 2000, User Manual, "Gravity Storm Software," Gravity Storm Software, LLC, 1999-2002, pp. 1-54.

P. Lavency and M. Vanhoedenaghe, "Knowledge Based Configuration Management", Phillips Research Laboratory, Brussels, Belgium, Copyright 1988 IEEE.

* cited by examiner

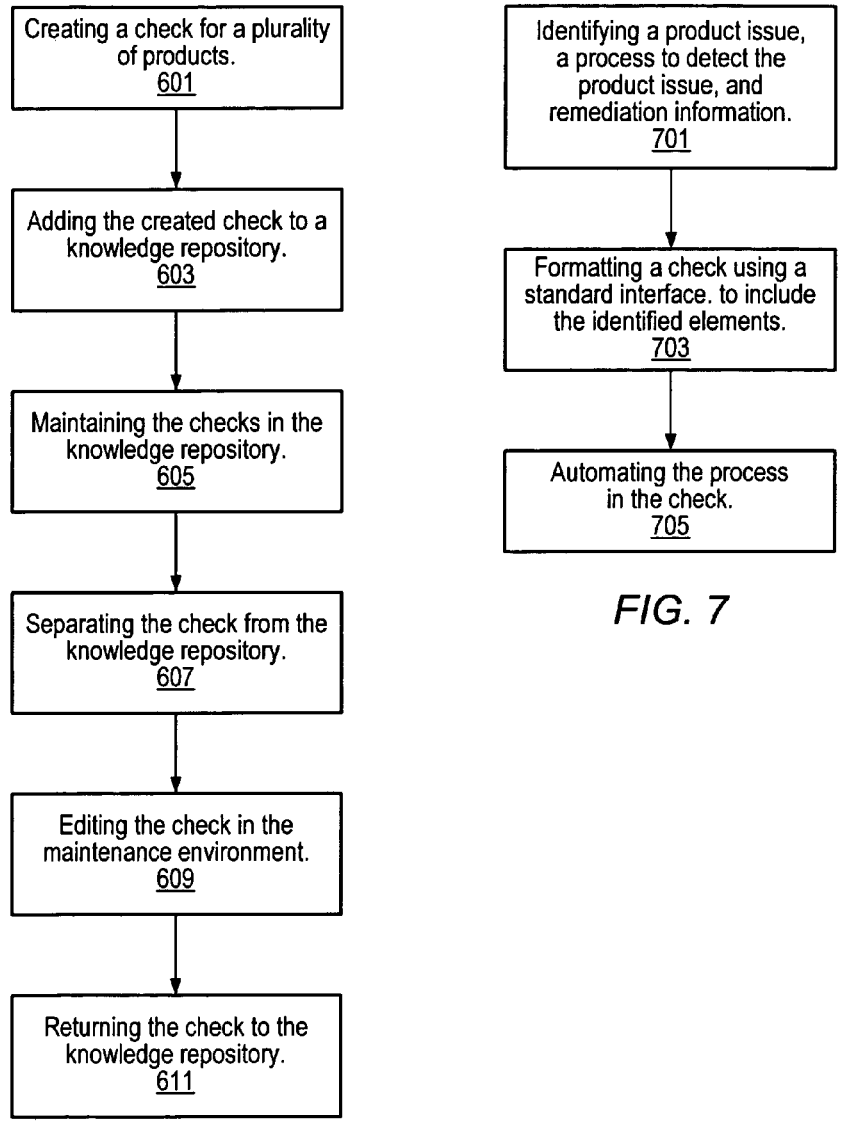

PRODUCT CHECK MATRIX

PRIORITY INFORMATION

This application is a continuation-in-part of U.S. patent application Ser. No. 10/135,483, filed Apr. 30, 2002, now U.S. Pat. No. 7,051,243, titled "Rules-Based Configuration Problem Detection", by Helgren, et al.

This application is also a continuation-in-part of U.S. patent application Ser. No. 09/917,597, filed Jul. 27, 2001, now U.S. Pat. No. 6,678,639, titled "Automated Problem Identification System", by Little, et al. which claims benefit of priority to U.S. provisional patent application No. 60/223,400, filed Aug. 4, 2000.

This application is also a continuation-in-part of U.S. patent application Ser. No. 10/318,702, filed Dec. 13, 2002, titled "Product Knowledge Management", by Little, et al.

BACKGROUND OF THE INVENTION

1. Field of the Invention

This invention relates to hardware and software installation and maintenance, and more particularly to software programs for diagnosing product issues.

2. Description of the Related Art

Computer networks and other products may have multiple components. When a product issue affects one component, the product issue may eventually affect the other similar components on the products in a comparable way. For example, if an installer installed several similar components on multiple products, the same error may have been made in each installation. Once the error is detected on one component, it may need to be remedied on similar components of other products. In addition, many product issues with components may not be detected until later if product issue symptoms are delayed. In addition, product issues discovered on one product may affect other similar products over the course of the product's lifetime.

Expert repairmen and on-site expert personnel may fix many product issues. Repair manuals may be consulted to aid with unfamiliar product issues. In addition, experts may watch or consult other experts to find out how to fix a product issue they are unfamiliar with. However, the spread of knowledge from expert to expert may be slow and incomplete. In many repair instances, the repairs for similar product issues may not be uniform and therefore, the results of these repairs may be unreliable. Furthermore, product issue solutions may change with time. Previously repaired products may need to be repaired again or inconsistent repairs across products may affect the product's reliability.

SUMMARY OF THE INVENTION

In various embodiments, a knowledge automation engine may be used to detect product issues on products. In some embodiments, a knowledge automation engine may evaluate a check against one or more facts to detect a product issue on a product and provide a user of the product remediation information. In some embodiments, a check may contain a product issue description, a rule to evaluate against a fact in order to detect the product issue, and remediation information to help a user address the product issue if the product issue is detected on the product. In some embodiments, product issues may include product installation validation and known product bugs. Facts used by the knowledge automation engine may include product configuration facts.

In various embodiments, a check may include one or more rules and reference one or more product check matrixes of facts, such as, but not limited to, identifiers for product packages and patches, to be used by the check. In some embodiments, a check may be a wrapper for a knowledge class that includes facts (packages and patches) and logic (class rules related to the packages and patches). In some embodiments, class facts may be accessed from a knowledge facts database. The class facts may be organized in product check matrixes. In some embodiments, as packages and/or patches become available for a product, they may be manually added to a product check matrix for the product. In some embodiments, the packages and patches may be automatically added to the product check matrix. For example, the packages and patches may be added to the product check matrix using predefined associations. The product check matrix may be used to update packages and/or patches (including adding new packages/patches and removing old packages/patches) on a product. For example, a knowledge automation engine may evaluate a rule from a check to determine if a latest software version has been installed on a product. If not, a knowledge automation engine may access the product check matrix for the product and apply the relevant packages and/or patches. In some embodiments, a product check matrix may include other information including, but not limited to, problem statements, reference documents, and corresponding product information. The additional stored information may be used in constructing a corresponding check for the product check matrix. In some embodiments, facts for the product check matrix may be stored on an knowledge facts database accessible by the knowledge automation engine.

In some embodiments, associations may be defined between packages and patches in the knowledge facts database. For example, if a patch is added to a patch database as an update or revision to a package used by a product check matrix, an association may be defined between the package and corresponding patch. In addition, if an old patch is removed (e.g., replaced with a new patch), the old patch identification may be disassociated from the affected package in the product check matrix. The association may be noted and used in the product check matrixes that use the affected package. For example, if a package with an association to a new patch is used by the check/product check matrix, the patch may be used with the corresponding package. In addition, if the patch is updated or changed, the association may allow the product check is matrix to update the associated patch. Associations may be created by a user separate from creating a product check matrix. In some embodiments, the association may be created with information including a package name, version or revision applied, severity level, and a description of the package. Other information may be added to the association. In some embodiments, the associations may be defined separate from the product check matrix and be used by multiple product check matrixes. In some embodiments, the associations may be defined with a particular product check matrix.

BRIEF DESCRIPTION OF THE DRAWINGS

FIG. 6 shows an embodiment of a flowchart for a check maintenance interface.

FIG. 7 shows an embodiment of a flowchart for creating a check.

DETAILED DESCRIPTION OF EMBODIMENTS

Figure 1:
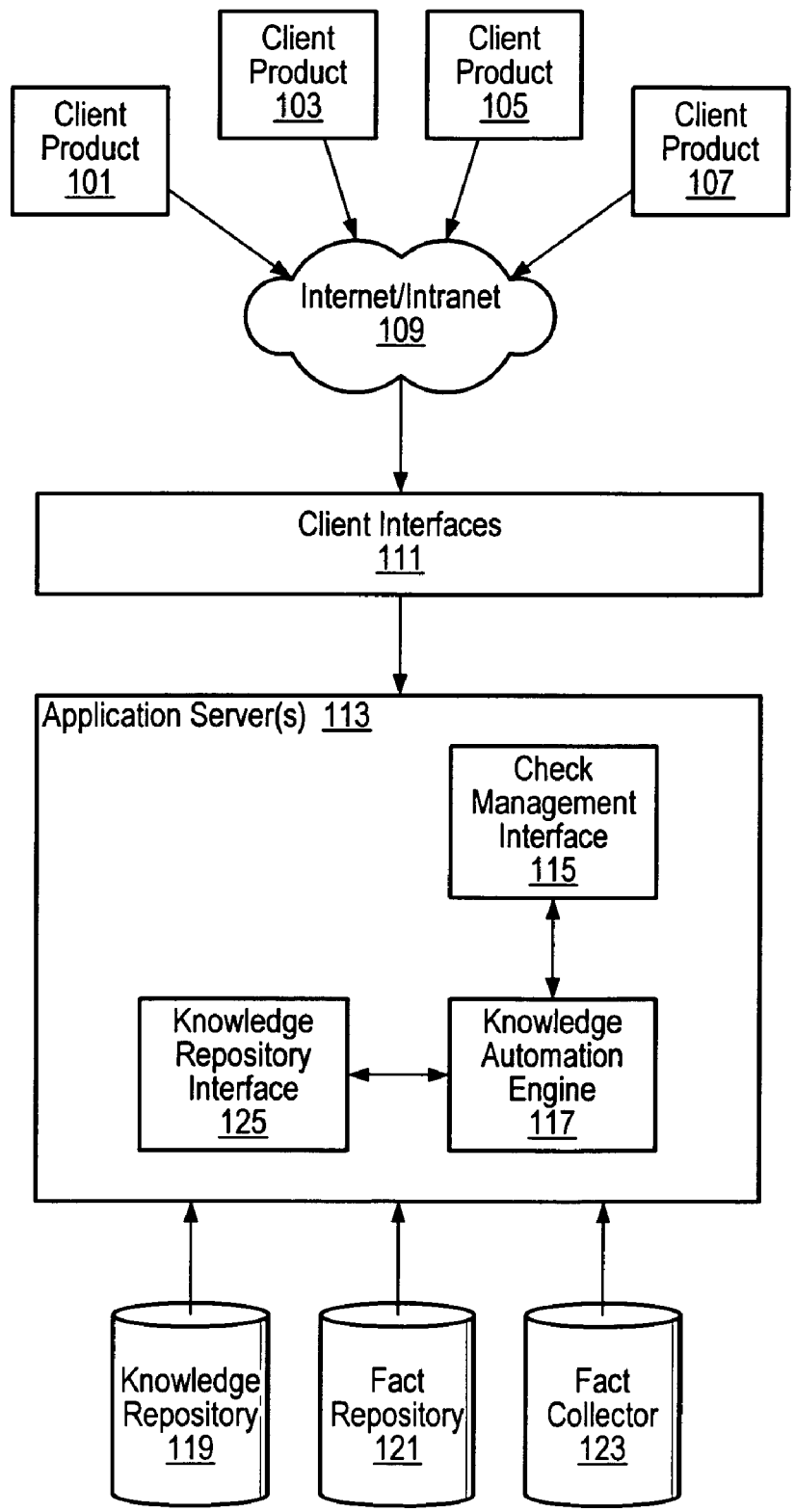
FIG. 1 shows an embodiment of a client product connected to a knowledge automation engine over a network.

FIG. 1 shows an embodiment of a client product connected to a knowledge automation engine over a network. The knowledge automation engine 117 may use product knowledge and one or more facts describing particular product configurations to detect product issues on client products 101, 103, 105, and 107. The client products 101, 103, 105, and 107 may include several types of products including but not limited to components on a computer system. The product issues may include but are not limited to system installation validation and known product bugs. A knowledge management service may maintain a knowledge repository 119 of product knowledge. The product knowledge may include checks configured to be automatically evaluated against one or more facts to detect the presence of the checks' respective product issues on the client products 101, 103, 105, and 107. The knowledge management service may further maintain a check management interface 115 for managing product knowledge in the knowledge repository 119 and a knowledge repository interface 125 to provide access to the product knowledge for one or more applications. The check management interface 115 may be accessible by the client products 101, 103, 105, and 107 over a network, such as but not limited to Internet 109, and may provide a standard interface for adding and editing checks in the knowledge repository 119. Different clients having different roles in regard to the client products 101, 103, 105, and 107 may add and edit checks using the standard interface over the different stages of a client product's life cycle.

The knowledge automation engine 117 may detect a product issue on a client product, such as client product 101, by evaluating a check from a knowledge repository 119 against one or more facts about the client product 101. The one or more facts about the client product 101 may be stored in a fact repository 121 or may be provided by a fact collector 123. In one embodiment, the knowledge automation engine 117 may access the client product 101 over the Internet 109. The knowledge automation engine 117 may run as an application on an application server 117. In one embodiment, the application may run the knowledge automation engine 117 locally on the client product 101 with the client product 101 accessing the knowledge repository 119 over the network, such as but not limited to the Internet 109. For example, a preemptive product issue identification application may be configured to run the knowledge automation engine 117 to evaluate a set of checks from the knowledge repository 119 against one or more facts from the fact repository 121 and fact collector 123. The preemptive product issue identification application may preemptively identify product issues for an installed product on the client product 101 while the application is running on the client product 101.

The checks evaluated by the knowledge automation engine 117 may contain one or more rules to detect the product issue on the client product 101 and remediation information to address the product issue if the product issue is detected on the client product 101. The one or more rules in the check may be formatted using a rule language such as but not limited to knowledge predicate language. The check may be created and maintained by clients and other personnel through a standard interface provided by the check management interface 115. For example, a client and a product engineer may use the same standard interface to create or edit a check. The checks created and edited by the client and the product engineer may then be in a standard format for storage in the knowledge repository 119 and for use by the knowledge automation engine 117. The checks may be evaluated against one or more static facts about a particular product configuration and/or one or more extracted facts collected about the client product by a fact collector 123 if the one or more facts needed to detect the product issue is not found in the fact repository 121. The one or more static facts representing the particular product configuration of the client product 101 may be stored in the fact repository 121 for a plurality of installed products. The one or more static facts may be updated by collecting the one or more facts about the product on a repeated basis. If the product issue is detected on the client product 101, the knowledge automation engine 117 may generate a report indicating product issues identified as existing on the client product configuration and the remediation information for each identified product issue.

After evaluating a check, the knowledge automation engine 117 may produce output in several different forms including but not limited to remediation information and statistical information. The clients may access the output reports and statistical information over the Internet 109 through client interfaces 111. The statistical information, such as but not limited to check telemetry facts including a check identity and whether the check passed or failed on the client product 101, may be accumulated over time and stored in a central database. Statistical information may be used to make product updates and predict product issues on other products. The clients and other personnel may also access the statistics on evaluated checks for other reasons. Statistics may indicate information including but not limited to the number of checks evaluated, check usage rates, check success rates, check failure rates, product issue correction rates, which checks are detecting the most product issues, and what product issues most products coupled to the product issue detection system are experiencing. Other statistics and information on evaluated checks may also be within the scope of the invention.

The client interface 111 may also provide information on checks evaluated on a specific product type. The information on checks evaluated on a product type may be accumulated and displayed on the client interface 111. Information may include but is not limited to a number of checks available for the product, number of enabled checks for the product, number of good checks for the product, number of reworked checks for the product, number of fails for all the product's checks, number of passes for the product's checks, average number of fails for the product's checks, and the average number of passes for the product's checks. In one embodiment, the client interface 111 may also be used for services including customer call center (CCC), connected telecommunications equipment (CTE), field work, training, benchmarking, competency tests, and other professional services. Other information for the client interface 111 may also be within the scope of the invention.

Figure 2:
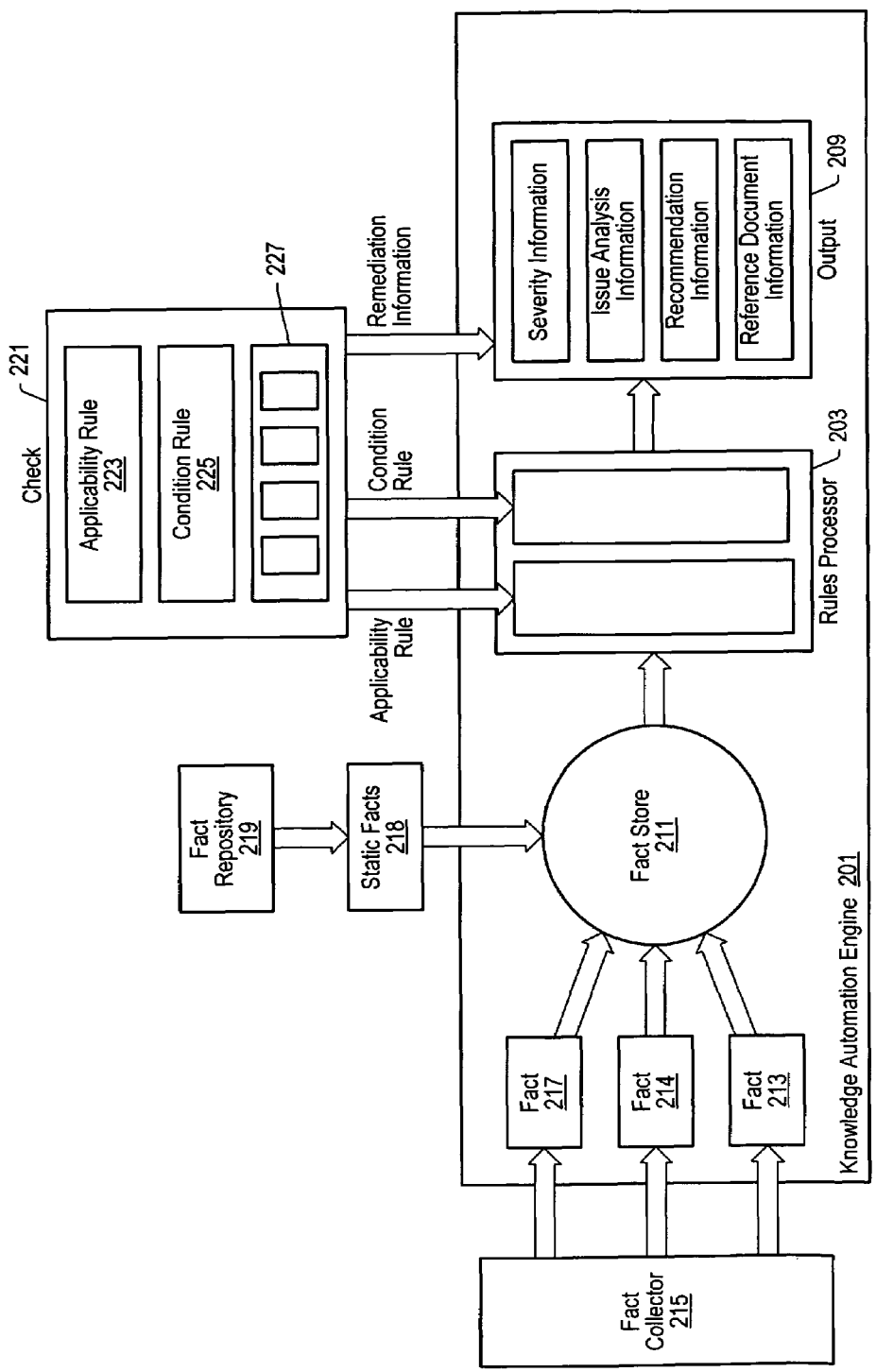
FIG. 2 shows an embodiment of the knowledge automation engine.

FIG. 2 shows an embodiment of a knowledge automation engine. The knowledge automation engine 201 may detect product issues on client products by evaluating a check 221 against one or more facts from a fact store 211. The check 221 may contain one or more applicability rules 223 and one or more condition rules 225 to detect a product issue. The check 221 may also contain remediation information 227 to provide as output 209 if a product issue is detected on the client product. The one or more applicability rules 223 may be evaluated by a rules processor 203 to determine if the check 221 is relevant to a type of product issue to be detected. The one or more condition rules 225 may be evaluated by a rules processor 203 to detect a product issue on the product. If the product issue is detected on the product, output 209, including but not limited to severity information, issue analysis information, recommendation information, and reference document information, may be provided to the client using the product by the knowledge automation engine 201. The knowledge automation engine 201 may provide the output by generating a report to indicate product issues identified to exist for the product configuration and the remediation information for each identified product issue. A fact store 211 may supply the rules processor 203 with one or more facts needed to evaluate the check 221. The fact store 211 may receive one or more static facts 218 from a fact repository 219 and one or more extracted facts 213, 214, and 217 from a fact collector 215. The one or more static facts 218 may contain one or more facts such as but not limited to product configuration facts on installed products used by the client. In addition, facts, such as extracted facts 213, 214, and 217, not included in the fact repository 219, but needed to evaluate the check 221 evaluated by the rules processor 203 may be provided by a fact collector 215. In response to not finding one or more needed facts in the fact repository 219, the knowledge automation engine 201 may query the fact collector 215 to collect one or more facts from alternate fact sources (not shown). If the fact collector 215 finds the one or more needed facts, the one or more needed facts may be sent to the knowledge automation engine 201.

Figure 3:
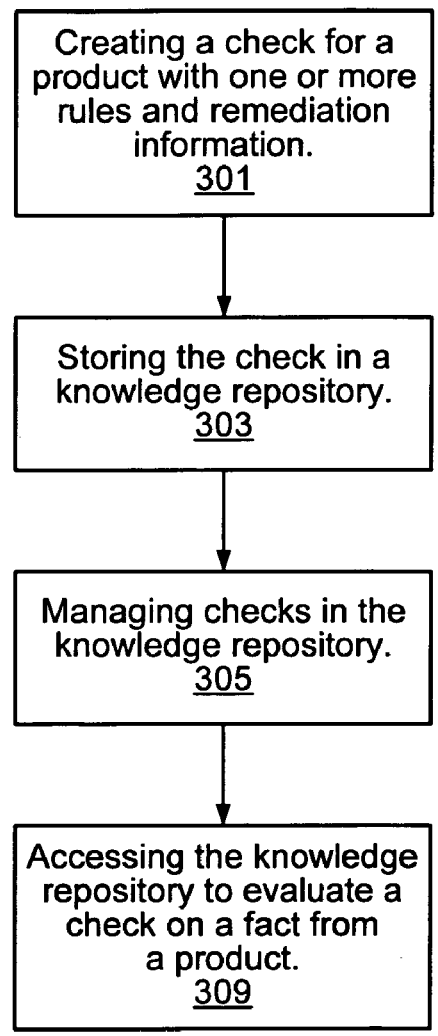
FIG. 3 shows an embodiment of a flowchart for managing checks in the knowledge repository.

FIG. 3 shows an embodiment of a flowchart for managing checks in the knowledge repository. At block 301, a check comprising one or more rules to detect a product issue and a remediation section may be created for a product. The check may be created using a standard format. At block 303, the check may be stored in a knowledge repository with other checks. The knowledge repository may be accessible over a network. At block 305, the checks in the knowledge repository may be managed. For example, existing checks may be edited and new checks may be added for each product at different life cycle stages for the product. At block 309, the knowledge repository may be accessed to evaluate a check using one or more facts derived from a product configuration. A set of checks from the knowledge repository may be evaluated against one or more facts describing a product configuration to detect the presence of respective issues for the product configuration. If the product issue is detected on the product, the knowledge automation engine may transmit the remediation information to a client of the product to address the product issue on the product. In one embodiment of the invention, the remediation information may be used to automatically address the product issue by remedying the product issue according to instructions in the remediation information.

Figure 4:
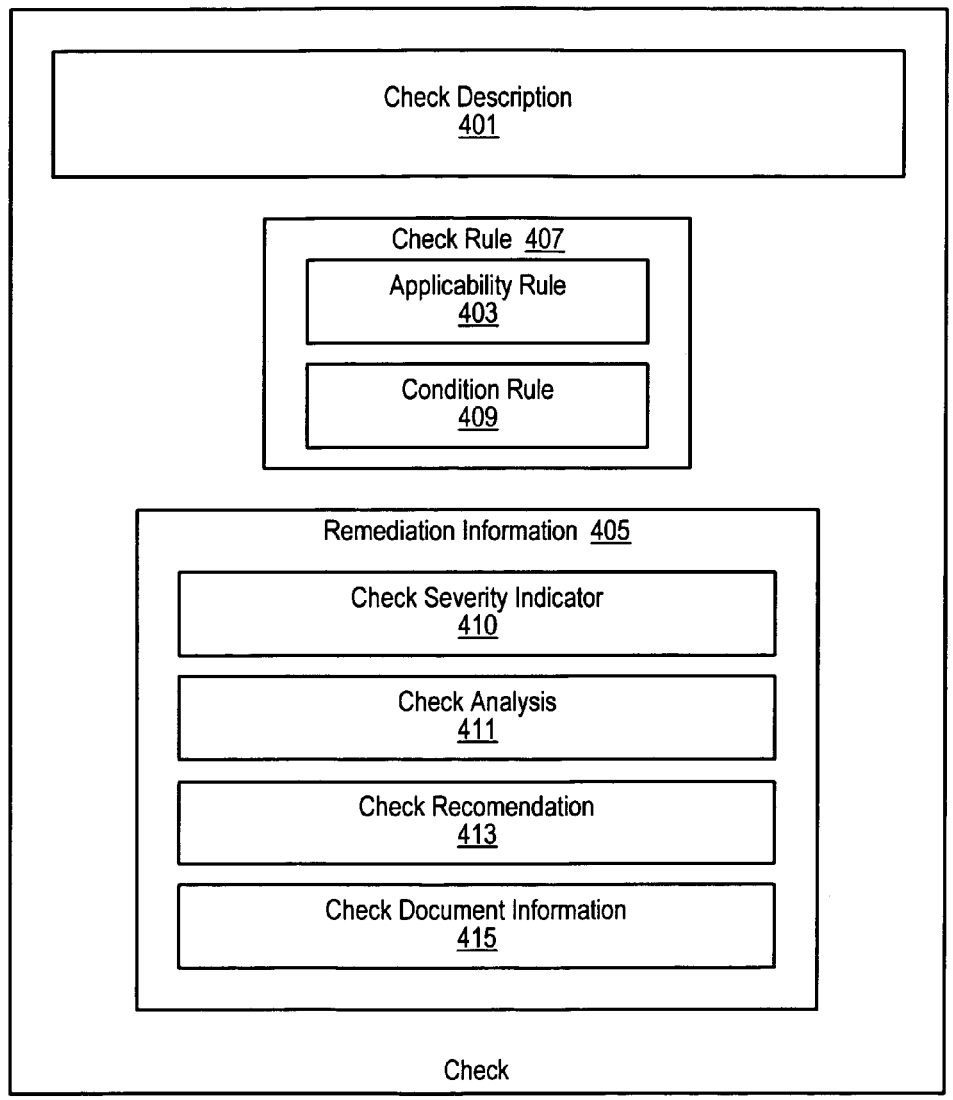
FIG. 4 shows an embodiment of a check for a knowledge automation engine.

FIG. 4 shows an embodiment of a check for a knowledge automation engine. A knowledge repository may be configured to store product knowledge for a plurality of products including checks. The checks in the knowledge repository may be accessible by an interface configured to allow a client to search the checks and evaluate the checks to detect a product issue. The checks may contain a description section 401, a rules section 403, and a remediation section 405. Other sections may also be within the scope of the invention. The description section 401 may contain searchable text related to a product and a product issue detectable on the product by the check. The rules section 403 may have one or more rules formatted according to a rule language, such as but not limited to knowledge predicate language, to evaluate with one or more facts, such as but not limited to product configuration facts in a fact repository or collected by a fact collector. The remediation section 405 may contain information to address the product issue detectable by the check. The check may also have other information such as but not limited to a check identifier, a title, an author, a version, and a change history.

The description section 401 may contain text describing a product issue detectable by the check. The description section 401 may also include consequences of the check failing (i.e., consequences of the product issue's presence on the product). The text in the description section 401 may be searchable by a client to locate a set of relevant checks to send to a knowledge automation engine. For example, the description section 401 may contain a product category indicator describing the product the check is used for. The product category indicator may also be used to organize the checks in the knowledge repository. The description section 401 may also contain a keyword searchable by a client to locate a set of relevant checks to send to the knowledge automation engine to detect an issue on the client's product. In one embodiment of the invention, the keyword may be a product family, product group, a product name, or a check category. Other keywords may also be within the scope of the invention. In one embodiment, the description section may also include a fact location for one or more facts needed to evaluate the check. For example, a filename "path" for a file on the product containing one or more facts needed to evaluate the check may be included in the check for use by a fact collector. In one embodiment, if a manual or physical inspection of the product is needed in order to get one or more facts from that inspection to evaluate the one or more rules in the check, a description of what to inspect and how to enter (i.e., user input to the product) the one or more facts may be included.

In one embodiment of the invention, the rule section 407 may include two types of rules: applicability rules 403 and condition rules 409. The one or more rules in the rule section 407 may be formatted in a rule language such as but not limited to Knowledge Predicate Language (KPL). KPL may be formatted as "(predicate operand operand . . . )" where a predicate may be a functional statement and each operand may be one or more facts to fill a specific argument needed to evaluate the functional statement. For example, if an operand named "var1" is equal to 5 and another operand named "var2" is equal to 2, then a KPL statement "(set ?var3 (add ?var1 ?var2))" may set an operand named "var3" equal to 7. The predicate "add" may perform the function of adding the operands. Other predicates with predetermined functions may also be with in the scope of the invention.

As another example, a predicate "compare" may have arguments "value1", "compareType", and "value2". "Value1" and "value2" may have a datatype such as but not limited to an "Integer" or a "Real". "CompareType" may be a type of comparison to be evaluated including but not limited to "==", "=", "!=", and "< >". Other comparisons may also be within the scope of the invention. In one embodiment, the predicate "compare" may be used in one or more check rules to detect whether a bad patch is installed. The predicate statement—

(compare "current_patch_version_number" "=" "bad_patch_version_number") where "bad_patch_version_number" may be equal to a known bad patch version number for the client product. The "current_patch_version_number" may be collected from the client product and compared to the "bad_patch_version_number" to determine if the current patch installed in the client product is a bad patch. For example, in one embodiment of the invention, the one or more check rules may be evaluated to determine if a bad patch has been installed. A current_patch_version_number such as 3.0 may be collected as facts from a product such as but not limited to a computer, and the one or more check rules may be evaluated to determine if the patch version number collected from the computer is equal to a known bad patch version number such as 2.1. For example, the one or more check rules may be (compare current_patch_version_number "=" bad_patch_version_number). If current_patch_version_number=2.1, the one or more check rules may return a true. If the product issue is detected, remediation section 405 in the check may be provided to the client. For example, the client may be provided with the location of a new patch to download.

KPL may also be a typeless language to allow a programmer to write one or more rules without accounting for the datatype of each operand. Datatypes may include but are not limited to boolean, integer, real, string, and list. Datatype "Boolean" (boolean) may include true, t, false, and f (case-insensitive). Datatype "Integer" (integer) may include non-decimal numbers and may be preceded with a + or −. Integers may be specified in a hexadecimal format with a leading x or X prefix. Integers may also be specified in octal format with a leading prefix. Datatype "Real" (real) may include decimal numbers, and may also be preceded with a + or −. Real numbers may also include scientific notations such as but not limited to "e" (for example, "2.5e01"). Datatype "String" (string) may include characters and may be single quoted or double quoted values. Internal white space may be allowed in strings. Datatype "List" (list) may include a list of values including other lists. The values in the list may not be of the same datatype. The list may be designated with brackets—[list of values]. Other datatypes such as but not limited to "facts", "datetime", and "time" may also be included in the invention. Because KPL may be typeless, values may be converted to a proper datatype before evaluation of a KPL statement. For example, the KPL statement (and true "false") may convert a string value "false" to a boolean value false to evaluate the "and" statement using two boolean values (i.e., (and true false)). Operands may be converted from one type to another on an as-needed basis. Some conversions may not be possible and a conversion exception may be thrown.

In one embodiment, a processor evaluating the KPL may determine what order to evaluate the operands in and correspondingly, some operands in a knowledge predicate statement may not be evaluated. For example, if an operand named "count" is equal to 5, and a predicate statement (and (compare count "=" 4) (compare count "< >" 3))

is sent to a predicate processor, the predicate processor may analyze the first operand—(compare count "=" 4) and stop since the first operand returns a "false". (The "and" predicate may return a "true" if both operands are "true" and a "false" if either or both operands are "false".) In one embodiment, the processor may save time by not analyzing the second operand since the first is "false" (and correspondingly, the "and" predicate will return a "false" regardless of whether the second operand is "true" or "false"). Other executable instructions for the predicate "and" may also be within the scope of the invention.

KPL may also allow a predicate statement to be named. For example, in one embodiment of the invention, the knowledge predicate statement may be named with the format (name: [optional] predicate [space-separated operands]). The statement (ruleFired "name:") or (ruleExcepted "name:") may be evaluated to indicate whether the statement named "name:" was evaluated or was excepted. Other names, formats for naming a statement, and predicates for checking the status of a named statement may also be within the scope of the invention. In addition, while established predicates may have preset executable instructions, new predicates may be added by the client. The client may define the new predicate with executable instructions for a processor to evaluate when it encounters the new predicate. Other predicates may also be within the scope of the invention.

In the rule section 407, the one or more applicability rules 403 may be formatted according to rule language to use to evaluate whether the check is related to relevant product characteristics. For example, if the check is designed to detect product issues for an older version of software than is currently installed on the client's product, the one or more applicability rules 403 may detect the different software version because of one or more facts received from the fact repository indicating the software version number. The one or more applicability rules 403 may also check operating system version, platform/system version number, storage limits of the system, and software packages installed on the system. Other information may also be within the scope of the invention for the one or more applicability rules 403 to check.

If evaluating the one or more applicability rules 403 returns a false, or some other negative identifier, the rest of the check including the one or more condition rules may not be evaluated. In another embodiment, a true or a positive identifier may indicate that the rest of the check does not need to be evaluated. Not evaluating the rest of the check may save evaluation time and eventually lead to faster product issue detection. In one embodiment, the one or more applicability rules in each check received by the knowledge automation engine may be evaluated before any of the one or more condition rules are evaluated. Also, in one embodiment, the check may not have applicability rules 403.

In one embodiment of the invention, the check may also contain a section of one or more condition rules 409 that use one or more facts about a product configuration to detect a product issue on the product. One or more condition rules 409 may be evaluated on one or more facts from the fact repository or collected by the fact collector to detect whether a product issue is present on a client's product. If the product issue is detected on the client's product, remediation section 405 may be relayed in output information provided by the knowledge automation engine. The output information may contain information including but not limited to severity indicators 410, product issue analysis information 411, recommendation information 413, and reference document information 415 previously stored with the check. The output information may be provided to the client in a format including but not limited to portable document format (PDF), PostScript from Adobe (PS), and hypertext markup language (HTML). The remediation section 405 may assist the client in addressing a product issue. In another embodiment of the invention, other information may also be relayed to the client. The remediation section 405 may further include report assignments to organize the output information in the checks in order to gather statistical information such as but not limited to cumulative information on checks that have been evaluated on a particular product.

The remediation section 405 for a product issue identifiable by the one or more condition rules may include a severity indicator 410 to indicate to a client of the product a subjective indication of the severity of the consequences of the product issue if the product issue is present on the product. The severity indicator 410 may be based on criteria including but not limited to impact on the customer, ability of the customer to recover, time required by the customer to recover, complexity of recovery, impact to a service provider, impact to the local service provider staff, financial impact to the service provider if the customer is not made aware of the product issue, and whether the product issue could lead to undesirable press for the service provider. Severity indicators 410 may also indicate the risk level for service interruption or downtime and data loss such as but not limited to critical for extreme risk, high for high risk, medium for medium risk, and low for low risk.

The remediation section 405 may also include a product issue analysis 411 with an analysis of the product issue. The product issue analysis 411 may contain information such as but not limited to a description of the product issue and how the product issue was detected by the check. The remediation section 405 may also include a product issue recommendation 413. The product issue recommendation 413 may include recommended information such as but not limited to information, actions, and steps to address the product issue.

The remediation section 405 may also include reference document information 415 including files with additional information related to the product issue if the product issue exists on the product. For example, the reference document information 415 may include but is not limited to README files, Field Information Notice (FIN), Field Change Order (FCO), product alert reports, best practice documents, product documentation, bug reports, InfoDOCs or Symptom & Resolution Database (SRDB), and official engineering publications.

In one embodiment, if a current patch version number is equal to a known bad patch version number (as seen in the example given above), remediation section 405 may include a bad patch description, analysis of the bad patch, a recommendation for how to update the patch (including instructions on how to download a new patch), and a path to files with additional information about the bad patch. The remediation section 405 may be provided to the client of the product to help the client address the bad patch. In another embodiment of the invention, the remediation section 405 may be used directly to remedy the product issue. For example, the client product or a remote computer may use the remediation section 405 to automatically download the new patch.

Figure 5:
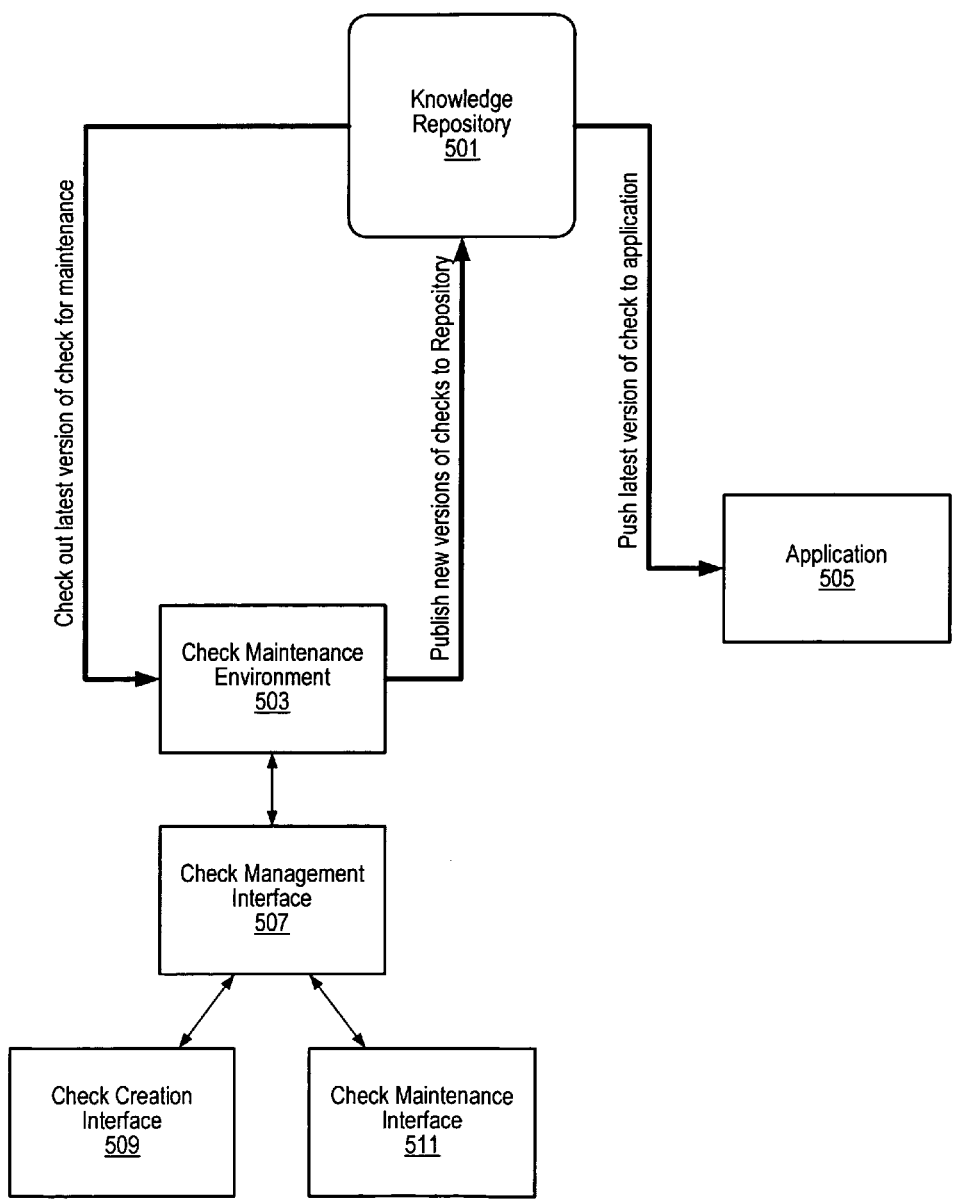
FIG. 5 shows an embodiment of a knowledge repository coupled to a check maintenance environment and an application for running a knowledge automation engine.

FIG. 5 shows an embodiment of a knowledge repository coupled to a check maintenance environment and an application running a knowledge automation engine. A check management interface 507 may manage the checks in the knowledge repository 501 by providing a standard interface over a network to allow clients to create and edit checks in the product issue detection system. The check management interface 507 may include a check creation interface 509 for adding checks to the knowledge repository 501 through a standard interface and a check maintenance interface for editing a check from the knowledge repository 501 through a standard interface. The check management interface may allow access to the checks for other reasons including but not limited to reviewing and automating checks, isolating checks that need to be remedied, and deleting old or non-functional checks from the knowledge repository. For example, a new check may be created, automated, and tested using the check creation interface. While a check is being created or edited, the check may be created in the check maintenance environment 503 or an existing check may be removed from the knowledge repository 501 and put into the check maintenance environment 503 to be edited. Several clients may create and edit checks using the standard interface including but not limited to engineers managing the product issue detection system, engineers managing the product, and other people associated with the product issue detection system and the customer product. The standard interface may ease integration of checks from various sources into one knowledge repository 501 accessible by knowledge automation engines coupled to the knowledge repository 501.

FIG. 6 shows an embodiment of a flowchart for a check maintenance interface. At block 601, the check maintenance interface may allow checks to be created for a plurality of products. At block 603, the created checks may be added to a knowledge repository. In one embodiment, the created checks may be automated and tested before adding them to the knowledge repository. At block 605, the check maintenance interface may maintain the checks in the knowledge repository. For example, at block 607, a check may be separated from the knowledge repository. At block 609, the check may be edited in the check maintenance environment. At block 611, the check may be returned to the knowledge repository. In one embodiment, edited checks may be automated and tested before they are put back into the knowledge repository.

FIG. 7 shows an embodiment of a flowchart for creating a check. At block 701, elements including but not limited to a product issue, a process to detect the product issue, and remediation information for the product issue may be identified by a client, a product engineer, or some other entity related to the product. At block 703, a check may be formatted using a standard interface to include the identified elements. At block 705, the process in the check may be automated. For example, the one or more rules in the check may be formatted in a rule language such as but not limited to KPL.

Figure 8:
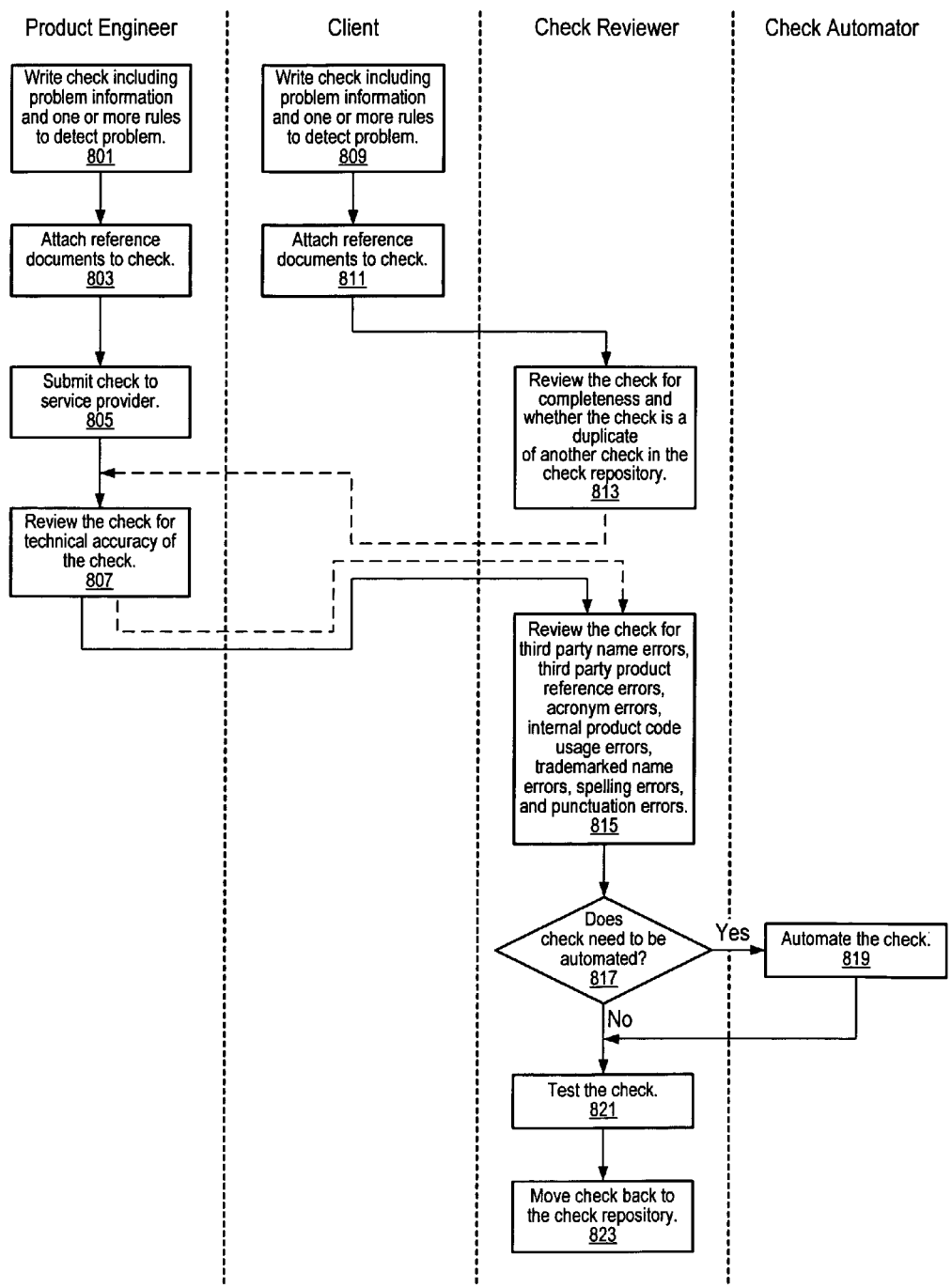
FIG. 8 shows an embodiment of a flowchart for creating a check by different people using the check creation interface.

FIG. 8 shows an embodiment of a flowchart for creating a check by different clients using the check creation interface. Other methods of adding new checks may also be within the scope of the invention. At block 801, a product engineer may write a check including remediation information and one or more rules to detect the product issue. Other people may also use the check creation interface to create a check. The product engineer may be in charge of writing and updating checks for a particular product or product group. The product engineer may include a metadata tag in the check that includes information such as but not limited to the check's author, history, application, product, whether the check is used internal or external to the service provider, the check's functional state, pass/fail statistics, and other dynamic content. At block 803, the product engineer may attach a location of a reference document to the check. At block 805, the product engineer may submit the check to a service provider. The service provider may maintain a product issue detection system including the knowledge repository and knowledge automation engine. The product engineer may check on the status of the check he is creating by using the check creation interface. For example, the product engineer may enter information such as but not limited to a check number assigned to the check, a check author's name, and/or a keyword. The check creation interface may then return the status of the check to the product engineer. For example, after the product engineer writes a check, he may submit the check for review. The status of the check may then indicate that the check is in a technical review process. Other information may be included in a response to the product engineer from the check creation interface including but not limited to check number, check author, check states, a check description, and a summary of statistics collected on the check.

At block 807, the check may be reviewed for technical accuracy. At block 809, a client may write a check including remediation information and one or more rules to detect the product issue. At block 811, a location of a reference document may be attached to a check. At block 813, the check may be reviewed to determine whether the check is complete and whether the check is a duplicate of another check in the knowledge repository. The review may be provided by a check reviewer such as but not limited to a person working for the service provider. The check may be checked for technical accuracy at block 807. At block 815, the check may be reviewed for errors such as but not limited to third party product reference errors, acronym errors, internal product instruction usage errors, trademarked name errors, spelling errors, and punctuation errors. At decision block 817, whether the check needs to be automated may be determined. A manual version of the check may be checked into the knowledge repository prior to automating the check. If the check does need to be automated, at block 819, a check automator such as but not limited to a programmer may automate the check.

If the check does not need to be automated, or after the check has been automated at block 819, the check may be tested at block 821. The check reviewer may test the check to confirm that an automated version of the check is performing as expected. For example, in one embodiment, the check reviewer may test the automated version of the check by identifying the check as ready for testing, reviewing the check to understand its intent and content, obtaining one or more facts that can be used to test the check, preparing and sending the one or more facts to the check maintenance environment, evaluating the check against the sent one or more facts, reviewing the check's output, and at block 823, the check may be moved back to the knowledge repository. To test the check, the check reviewer may use one or more facts that are expected to pass and one or more facts that are expected to fail. For example, a check applying to three different operating system versions may require a separate set of one or more facts representing each operating system (and one set to pass and one set to fail=a minimum of six tests). For example, the check may verify that Patch A is installed for Solaris 2.1, Patch B for Solaris 2.3, and Patch C for Solaris 2.4.

The check reviewer may also use the severity level in a check description section to determine how many test cases to run. For example, if the severity is low with a maximum number of two scenarios, the check reviewer may run a maximum of six cases. If the severity is medium with a maximum number of two scenarios, the check reviewer may run a maximum of six cases. If the severity is high with a maximum number of three scenarios, the check reviewer may run a maximum of nine cases. If the severity is critical with a maximum number of four scenarios, the check reviewer may run a maximum of twelve cases. If there are more than four scenarios, the client or product engineer may indicate which scenarios should be tested and which checks may require that all scenarios be tested. The check reviewer may use one or more facts that does not contain applicabilities to test for non-applicability. A manual check may be checked into production when a check is first authored and before it is automated. The manual check may also be used when a product issue is found with code or output of an automated check in production. The check reviewer may test the manual check by passing or failing the check by manually inspecting the one or more facts.

Figure 9:
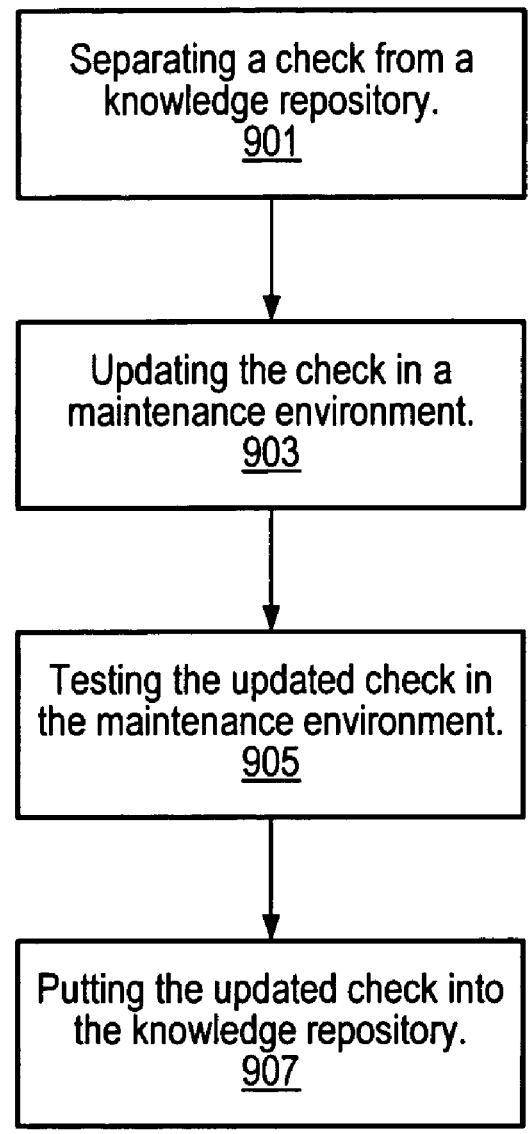
FIG. 9 shows an embodiment of a flowchart for editing a check.

FIG. 9 shows an embodiment of a flowchart for editing a check. At block 901, a check may be separated from a knowledge repository. The check may be put into a check maintenance environment and accessed through a check maintenance interface. At block 903, the check may be updated in the check maintenance environment. Updating the check may include fixing problems with the check and editing the check to make the check more efficient. Other check updates may also be included in the invention. At block 905, the updated check may be tested in the check maintenance environment. At block 907, the updated check may be put into the knowledge repository. At any point in the method, a client or product engineer may send an inquiry to the check maintenance environment to receive a status of the check.

Figure 10:
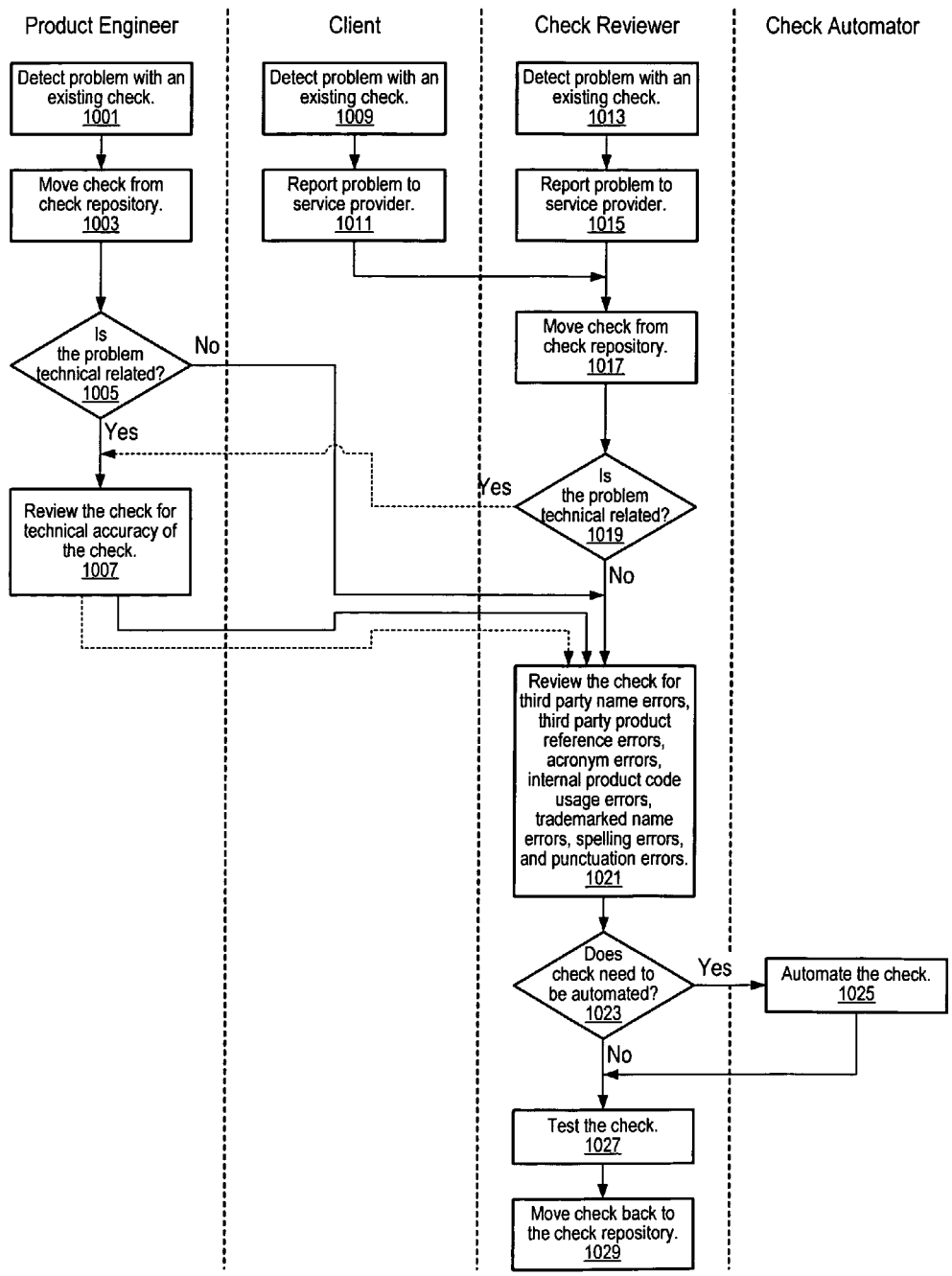
FIG. 10 shows an embodiment of the invention of a flowchart for editing a check.

FIG. 10 shows an embodiment of a flowchart for editing a check. At block 1001, a product engineer may detect a problem with an existing check. When a problem is detected with a check, the service provider may be contacted and the service provider may write up a document for internal purposes indicating that the check may have a problem. Information such as but not limited to check number, description of issue, report number, host ID, explorer file, and contact information may be sent to the service provider. The service provider may be contacted by several methods including but not limited to a telephone call and email. In one embodiment, the service provider may not be notified at all. At block 1003, a check may be moved out of a knowledge repository. In one embodiment of the invention, the check may be checked out of the knowledge repository by making a copy of the check and putting the copy in the check maintenance environment where it can be modified. The check may also be locked so that only one client can modify the check at a time. In one embodiment, the check may be edited in the knowledge repository without being moved or checked out.

After the check is modified, the check may be unlocked and checked back into the knowledge repository for use. At decision block 1005, whether the problem with the check is technical related may be determined. If the problem with the check is technical related, at block 1007, the check may be reviewed for technical accuracy. If the problem is not technical related or after the check has been reviewed for technical accuracy at block 1007, at block 1021, the check may be reviewed for errors including but not limited to third party name errors, third party product reference errors, acronym errors, internal product instructions usage errors, spelling errors, and punctuation errors. At decision block 1023, whether the check needs to be automated may be determined. A manual version of the check may be checked into the knowledge repository prior to automating the check. If the check needs to be automated, at block 1025, the check may be automated by a check automator such as but not limited to a programmer. For example, the programmer may provide executable program instructions based on the one or more rules to detect the product issue when evaluated with one or more facts from a product configuration. The executable program instructions may be in KPL. If the check does not need to be automated, or after the check has been automated at block 1025, the check may be tested at block 1027. At block 1029, the check may be moved back to the knowledge repository. The knowledge repository may assign the edited check a version number.

If the problem with the check is detected by a client at block 1009, then at block 1011, the problem may be reported to the service provider by the client. At block 1017, the check may be moved out of the knowledge repository. At decision block 1019, whether the problem with the check is technical related may be determined and the same paths as decision block 1005 may be followed. If the problem is detected by a check reviewer at block 1013, at block 1015, the problem may be reported to a service provider. The flowchart may then move to block 1017 and follow the similar path. Changes to a check may be written to a history file and stored. The changes may include but are not limited to the actual text changed, the name of the person who made the changes, and the date and time the changes were made.

The checks may also be assigned a state to show the check's status in the knowledge repository/check maintenance environment and indicate a check's current functionality. The states may include but are not limited to an auto state, a functional state, a content/knowledge state, and an application state. The auto state may include but is not limited to "auto" to indicate that a check may be evaluated automatically to detect the product issue, "manual" to indicate that a check may need to be manually verified by human intervention, and "survey" to indicate that the check may require human intervention to physically inspect the product or interview a customer staff member for confirmation that the product issue detected by the check exists. A survey check may need to be reviewed before checking it into the knowledge repository. Because the survey check may require actual physical inspection of a physical site or equipment, actual testing may not be performed. The functional state may include but is not limited to "disabled", to indicate that a check is not accessible to be evaluated on a product, and "enabled" to indicate that a check may be evaluated on a product.

The content/knowledge state may include but is not limited to several sections of states such as but not limited to check review (states: "new," "acquisition review", "technical review", and "standards review"), check automation (states: "automation review", "automation wait", and "automation development"), check testing (states: "automation test" and "rework"), and check deposition (states: "good", "recycle", and "archive").

In the check review section, the "new" state may indicate that a check is new and in the process of being written. The "acquisition review" state may indicate a check was created by a client and needs further review. The "technical review" state may indicate that a check is being reviewed for technical content. The "standards review" state may indicate that a check is being reviewed for accuracy in standards such as but not limited to spelling, grammar, and legal wording.

In the check automation section, the "automation review" state may indicate that a check is being reviewed to determine if it can be automated. The "automation wait" state may indicate that a check is waiting to be automated. The "automation development" state may indicate that the check is being automated by a check automator who may test the check after it is automated. In the check testing section, the "automation test" state may indicate that the check is being tested to verify that the automated version of the check evaluates as intended. The testing may include processes including but not limited to using at least two fact collector files to capture pass and fail conditions, using at least one application that utilizes the check, and confirming that the output report from the application is formatted and worded correctly. The "rework" state may indicate that a check may be in the process of being remedied or rewritten. For example, reworking may include but is not limited to revising technical content, correcting spelling or grammar errors, and remedying automation instructions.

In the check disposition section, the "good" state may indicate that the check has finished the authorship or maintenance process and has passed testing. The "recycle" state may indicate that the check is a duplicate or contains the same information as another check in the knowledge repository and therefore the check number may be recycled. In another embodiment of the invention, a check may be recycled if it has been disabled and has not failed. The "archive" state may indicate that the check or the product associated with the check has reached its end of life. The "application" state may include but is not limited to "internal", to indicate that a check may only be available for internal use and "external", to indicate that a check may be available for internal and customer use. In one embodiment of the invention, checks that may need to be maintained as confidential may be marked confidential.

In one embodiment of the invention, a check with a content state equal to "Auto Wait" may be automated. Check automation may be done in a check maintenance environment. A check automator may review checks with a content state equal to "Auto Wait" periodically, such as but not limited to daily, to identify new checks to be automated. The check automator may be assigned to automate a check based on criteria including but not limited to product area of the check. The check automator may lock the check before automating it. If the check has not been checked out, the check automator may check out the check prior to locking the check. The check automator may access the check and change the content state of the check to "Automation Development" ("Auto Dev"). The check automator may assign the check to himself. The check automator may access the check and review the check's attributes, specifically a product issue description and one or more rules. The one or more rules may explicitly describe any applicabilities of the check. If there are no applicabilities given, the check may be assumed applicable for all products and may appear in all checklists.

To publish a check version to the knowledge repository, the service provider may change the check's content state to "Good". The check may be changed to "Good" content state when it runs only against one or more facts containing the applicable hardware or software, passes when run against the one or more facts containing the applicabilities but not the failure condition, and if it fails when run against the one or more facts containing the applicabilities and the failure condition. The service provider may change the check's content state from "Auto Test" to "Good" in the check maintenance environment. The latest version of the check may not be used by applications until it has been moved to the knowledge repository by copying the new check attributes and automation code to the knowledge repository. Depending on how various applications are designed, the check may either be "pulled in" by an application or "pushed" directly to the application. The service provider may publish a new version of the check to the knowledge repository by using a Check Edit UI screen. Other methods of activating a check in the knowledge repository may also be within the scope of the invention.

Figure 11:
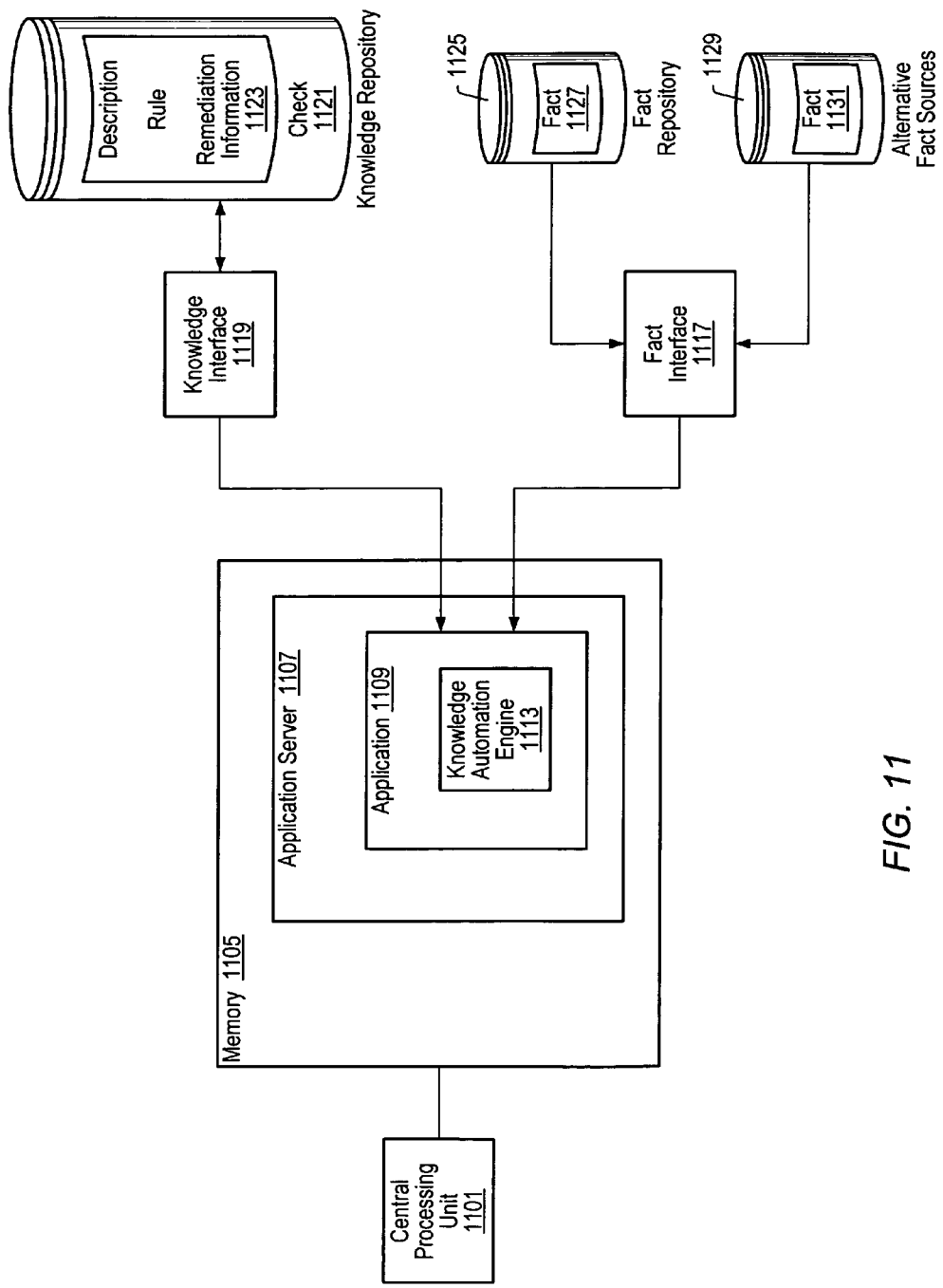
FIG. 11 shows an embodiment of a computer system for implementing a knowledge automation engine.

FIG. 11 shows an embodiment of a computer system for implementing a knowledge automation engine. A processor, such as but not limited to a central processing unit 1101, may be coupled to a memory 1105 by an interconnect 1103. The interconnect 1103 may communicate data from one component to another. For example, interconnect 1103 may be an interconnect such as but not limited to a point-to-point interconnect, a shared bus, a combination of point-to-point interconnects and one or more buses, or a bus hierarchy including a system bus, CPU bus, memory bus and Input/Output (I/O) buses such as a peripheral component interconnect (PCI) bus. The memory 1105 may be configured to store program instructions executable by the processor 1101 to implement a knowledge automation engine 1113. The memory 1105 may include an installation medium, such as but not limited to a CD-ROM, or floppy disk; a computer system memory such as but not limited to DRAM, SRAM, EDO DRAM, SDRAM, DDR SDRAM, Rambus RAM, or a non-volatile memory such as a magnetic media, such as but not limited to a hard drive 1130, or optical storage. The memory 1105 may also include combinations of memory mediums. The memory 1105 may be located in a first computer in which the programs are executed, or may be located in a second different computer, coupled to the first computer over a network. The second computer may provide the program instructions to the first computer for execution.

The computer system 1100 may be a computer such as but not limited to a personal computer system, mainframe computer system, workstation, network appliance, is Internet appliance, personal digital assistant (PDA), or television system. The computer system 1100 may encompass any device having a processor 1101, which executes instructions from a memory 1105. The memory 1105 may store a software program for event-triggered transaction processing. The software program may be implemented using techniques such as but not limited to procedure-based techniques, component-based techniques, and object-oriented techniques. For example, the software program may be implemented using software such as but not limited to ActiveX controls, C++ objects, JavaBeans, Microsoft Foundation Classes (MFC).

The knowledge automation engine 1113 may be coupled to a knowledge interface 1119 to receive one or more checks 1123 from a knowledge repository 1121 and a fact interface 1117 to receive one or more facts 1127 and 1131 from a fact repository 1125 and alternative fact sources 1129. The knowledge automation engine 1113 may automatically evaluate one or more rules in the one or more checks 1123 against the one or more facts 1127 and 1131 to determine if product issues specified by the one or more checks 1123 exists for the product configuration. If the knowledge automation engine 1113 detects a product issue, remediation information from the check 1123 may be provided to a client of the product. The knowledge automation engine 1113 may be self-contained in an application 1109 on a client product. The knowledge automation engine 1113 may also be software in a programming language that runs on various products that use translators. The programming language for the knowledge automation engine 1113 may use code compiled into bytecodes that may run on products with a translator to interpret the bytecodes into executable language for that product's hardware. Other programming languages and applications to execute the knowledge automation engine, such as but not limited to Wizard, Analyzers, Oracle, Serengeti, Virtual Operating System (VOS) and Cluster, may also be within the scope of the invention. If the knowledge automation engine 1113 is self-contained on a client product, the checks 1123 and one or more facts 1127 and 1131 may be received by the knowledge automation engine 1113 over a network. For example, the knowledge automation engine 1113 may receive the one or more facts in a form such as but not limited to eXtensible Markup Language (XML) through a remote method invocation (RMI). In one embodiment, the knowledge automation engine 1113 may receive one or more facts 1131 directly from the client product over a network, such as the Internet, and detect product issues on the client product without the knowledge automation engine 1113 being embedded in the client product. If a client interfaces with the application server 1107 over the Internet, the client may use hypertext transfer protocol (HTTP). The client may also interface to perform other external functions such as but not limited to ordering services, accessing knowledge management, accessing profile, accessing management and remediation, and accessing other customer support.

Figure 12:
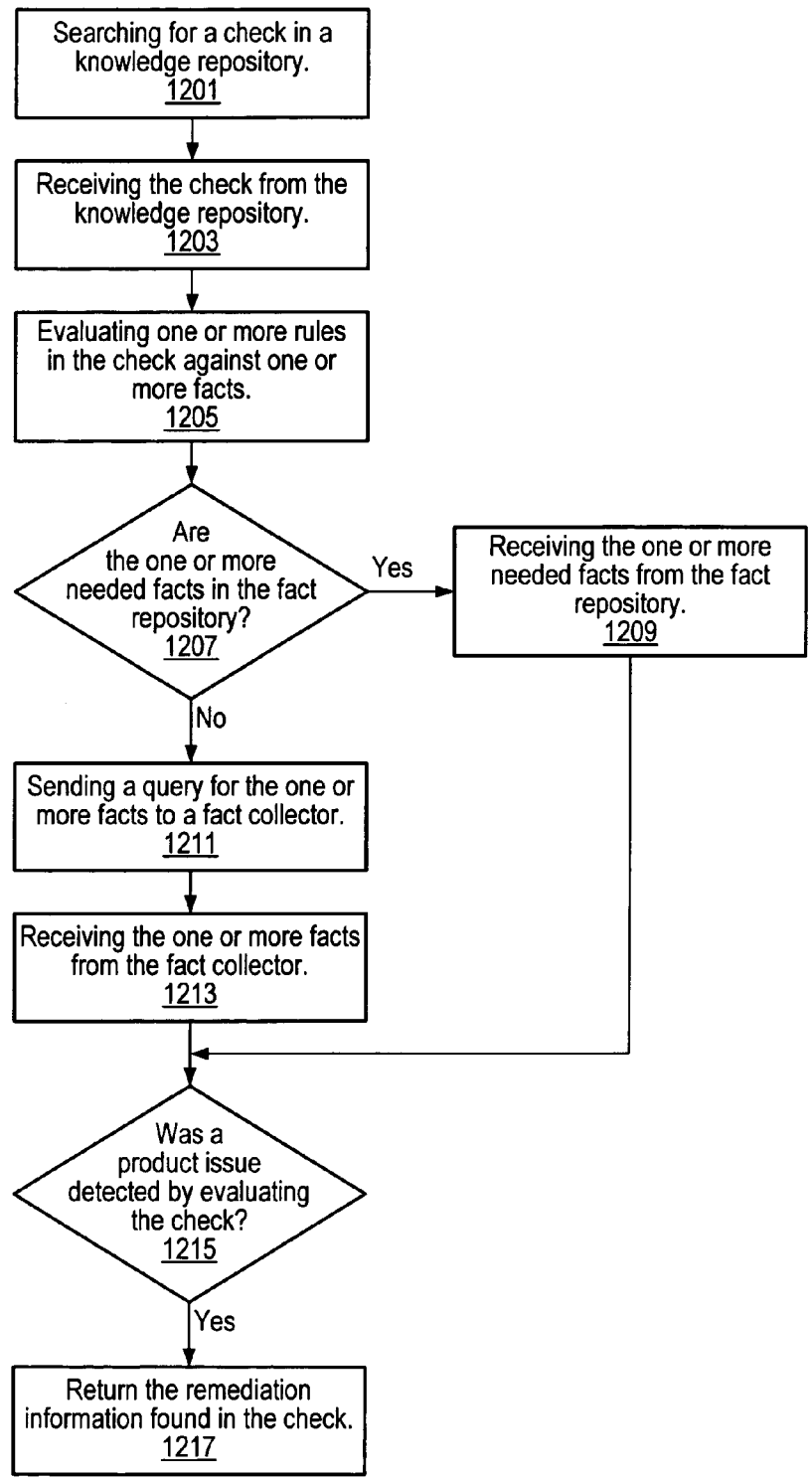
FIG. 12 shows an embodiment of a flowchart for the knowledge automation engine.

FIG. 12 shows an embodiment of a flowchart for the knowledge automation engine. At block 1201, a check may be searched for in a knowledge repository using a knowledge interface. For example, a keyword in a description section of the check that indicates the type of product issue detectable by the check may be searched. At block 1203, the check may be received from the knowledge repository through the knowledge interface. At block 1205, the one or more rules in the check may be evaluated against one or more facts from a product configuration. At decision block 1207, a fact interface may determine if the one or more needed facts is in the fact repository. If the one or more needed facts is in the fact repository, at block 1209, the knowledge automation engine may receive the one or more needed facts from the fact repository. If the one or more needed facts is not found in the fact repository, at block 1211, a query for the one or more facts may be sent to a fact collector. The fact collector may search alternate fact sources. Alternate fact sources may include one or more facts received directly from a client through a client interface. In one embodiment, a client may be instructed to perform a set of instructions and input the one or more resulting facts. For example, the client may be asked to read a serial number off of the product and enter the serial number into the client interface. In one embodiment, the client interface may be a personal digital assistant (PDA) interface or hand-held interface used by a technician in the field trying to repair the product. For example, the PDA interface may be but is not limited to a Palm Pilot™. At block 1213, the knowledge automation engine may receive the one or more facts from the fact interface after the fact interface receives the one or more facts from the fact collector. At decision block 1215, the knowledge automation engine may determine if the product issue was detected by the evaluated check. If the product issue was detected by the evaluated check, at block 1217, the remediation information found in the check may be returned to the client of the knowledge automation engine.

Figure 13:
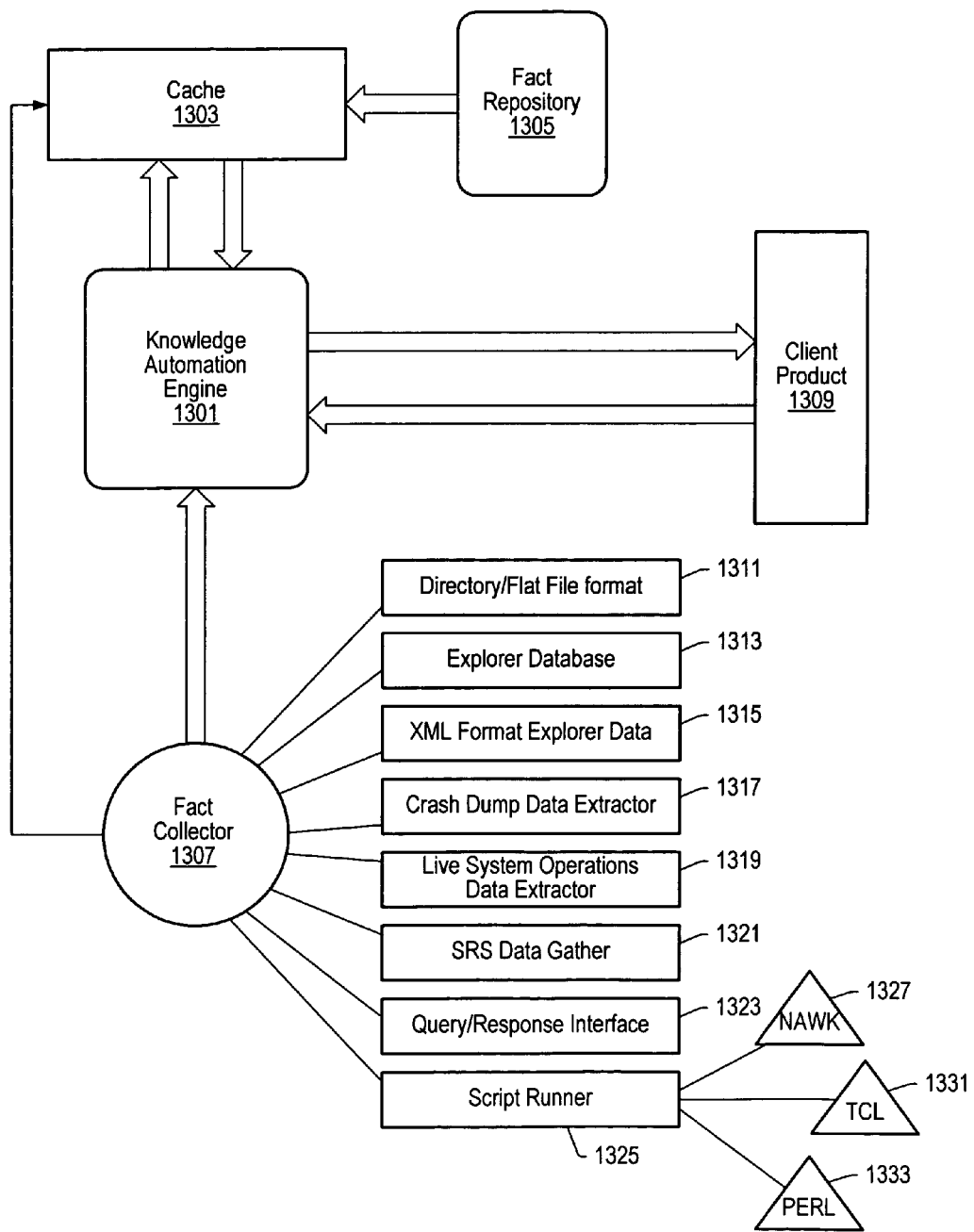
FIG. 13 shows an embodiment of a knowledge automation engine coupled to a fact repository and a data collector through a cache.

FIG. 13 shows an embodiment of a knowledge automation engine coupled to a fact repository and a data collector through a cache. The knowledge automation engine 1301 configured to receive one or more checks and one or more facts to automatically evaluate the one or more checks against the one or more facts to determine if any product issues specified by the one or more checks exists for the product configuration of the client product 1309. The one or more facts received from the fact repository 1305 may be one or more static facts about a product configuration and may be organized in a standard pattern such as but not limited to fact slots. If one or more facts are needed by the knowledge automation engine 1301 to evaluate a check and the one or more facts are not found in the fact repository 1305, the knowledge automation engine 1301 may send a query to the fact collector 1307 for the one or more needed facts. The fact collector may use alternative fact sources from formats including but not limited to directory/flat-file format 1311, explorer databases 1313, XML format explorer data 1313, crash dump data extractors 1317, live system operations data extractors 1319, secondary request to send (SRS) data gatherers 1321, query/response interfaces 1323, and script runners 1325. The script runners 1325 may run scripts to collect facts including but not limited to New Aho Weinberger Kernighan (NAWK) pattern scanning language 1327, Tool command language (TCL) 1331, and practical extraction and reporting language (PERL) 1331. One or more facts from a fact repository 1305 and one or more facts from a fact collector 1307 may go to a central cache 1303 before being sent to the knowledge automation engine 1301. In one embodiment, the one or more facts may be sent directly from the fact repository 1305 and the fact collector 1307 to the knowledge automation engine 1301 without being sent to a central cache 1303.

The fact collector 1307 may collect one or more facts from hardware and software coupled to products that may be coupled to the product issue detection system. The fact collector 1307 may also collect one or more facts from other sources including but not is limited to one or more facts from a client interface, one or more facts from files provided by a client, and one or more facts from other external sources. The fact collector 1307 or the fact repository 1305 may also update the one or more facts in the fact repository 1305 in the product issue detection system by recollecting one or more facts in real time from products coupled to the product issue detection system on a periodic basis. Time between updates may depend on criteria such as but not limited to client preferences. For example, in one embodiment of the invention, one or more facts may be continuously updated. In another embodiment of the invention, one or more facts may be updated infrequently such as but not limited to once a year. The one or more facts relevant to a client product 1309 and collected by the fact collector 1307 to be stored in the fact repository 1305 may include but are not limited to patch information, disk firmware version information, and package information. The fact repository 1305 used to store the one or more facts may be a Jar file comprised of Java objects. The fact repository may also be stored in other formats including but not limited to flat-files, ZIP files, Javaspaces, and Oracle Relational Database Management System (RDBMS). The one or more facts in the fact repository can be modified by clients in several ways including but not limited to deleting a fact, deleting a set of facts based on a regular expression, getting a fact, getting a fact class definition, getting a set of fact classes based on a regular expression, listing fact instances, and putting a fact into the fact repository.

Figure 14:
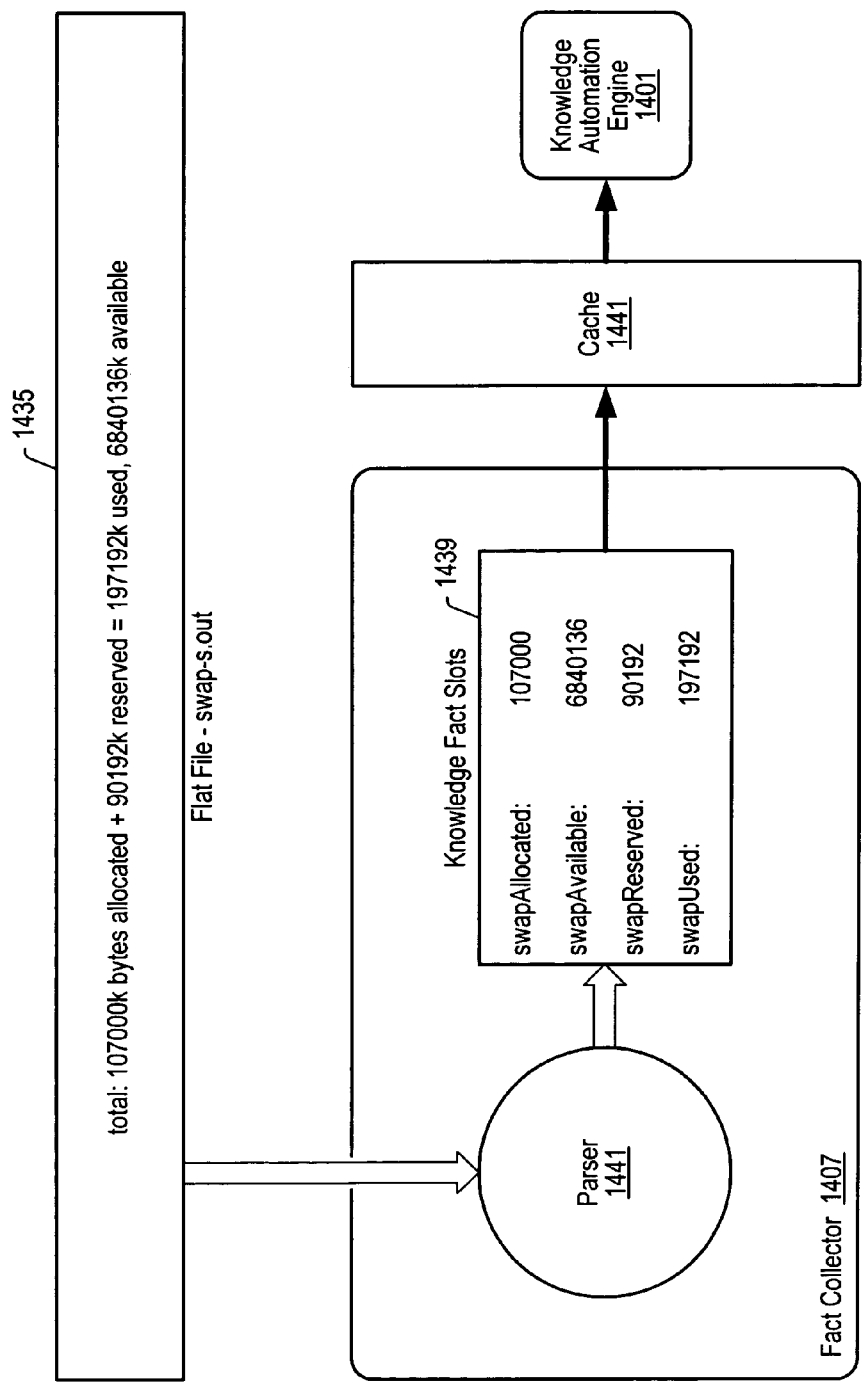
FIG. 14 shows an embodiment of a fact collector coupled to a knowledge automation engine and a cache.

FIG. 14 shows an embodiment of a fact collector coupled to a knowledge automation engine and a cache. The fact collector 1407 may collect one or more facts from an alternate fact source such as flat file (swap-s.out) 1435. The parser 1441 may have the predetermined format of the file that gives the location of the one or more facts in the file. The predetermined format may allow the parser to pick out the one or more facts in the flat file 1435 needed for the fact slots 1439. The parser 1441 may parse the one or more facts in the flat file 1435 into predetermined fact slots 1439. The one or more facts may be delivered to the cache 1441 and to the knowledge automation engine 1401 to be used in evaluating a check. In one embodiment, the one or more facts may be sent directly to the knowledge automation engine 1441 instead of the cache. In another embodiment, the knowledge automation engine 1441 may access the fact collector 1407 and read the one or more facts the knowledge automation engine 1441 needs directly from the fact slots 1439.

Figure 15:
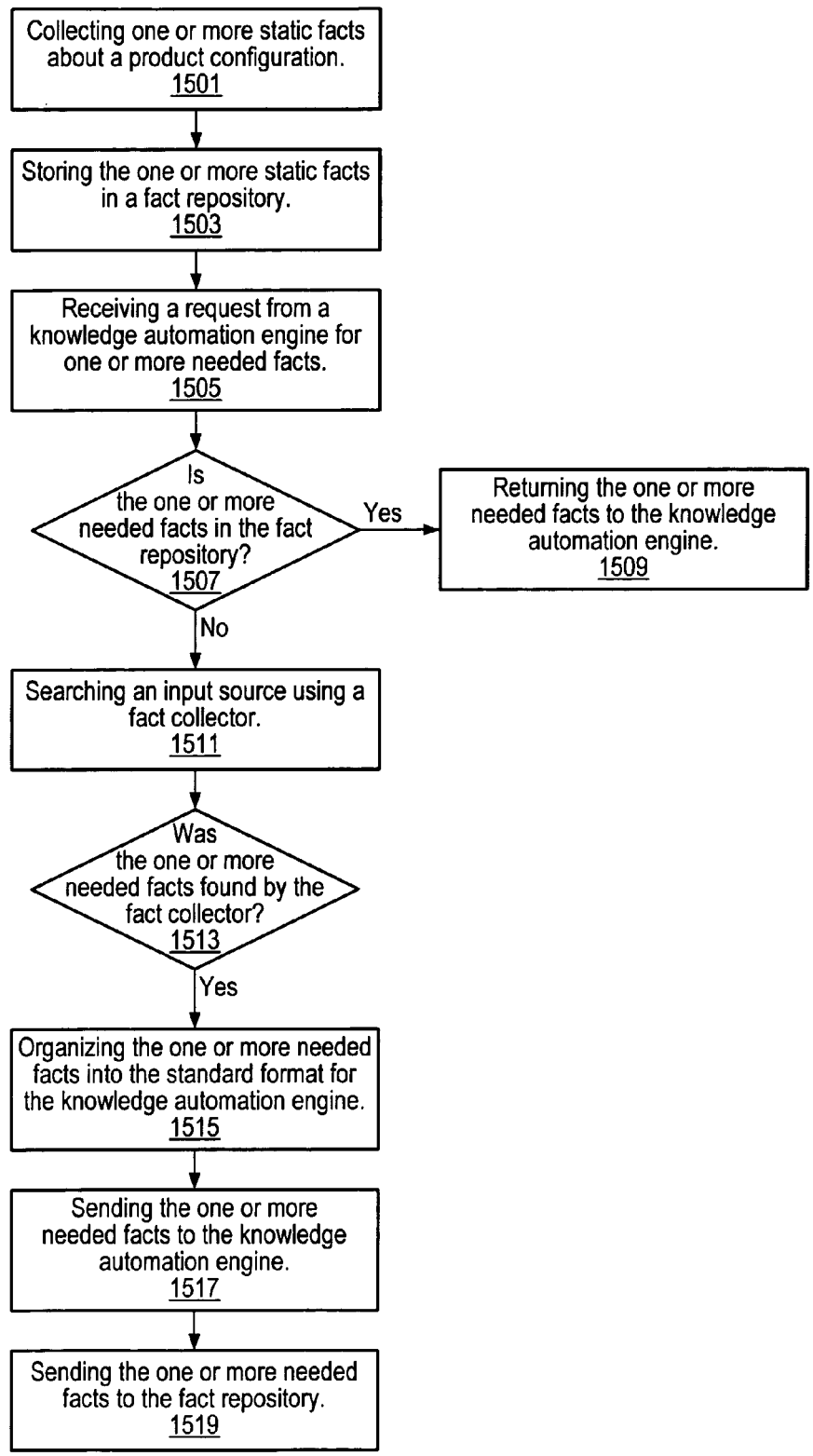
FIG. 15 shows an embodiment of a flowchart for providing a knowledge automation engine facts to use in evaluating checks.

FIG. 15 shows an embodiment of a flowchart for providing a knowledge automation engine one or more facts to use in evaluating checks. At block 1501, one or more static facts may be collected about a product configuration. At block 1503, the one or more static facts may be stored in a fact repository. At block 1505, a request from the knowledge automation engine may be received for one or more facts needed to evaluate a check. In one embodiment, the request may include information about the needed one or more facts including but not limited to a fact class name, a fact instance name, and a slot name. Other information about the one or more needed facts may also be within the scope of the invention. The fact repository may use the information to locate the one or more facts. At decision block 1507, the fact repository may determine if the one or more needed facts has been found in the fact repository. If the one or more facts has been found in the fact repository, the fact repository may send the one or more needed facts to the knowledge automation engine. If the one or more facts has not been found in the fact repository, at block 1511, a fact collector may search an alternate fact source for the one or more needed facts. The knowledge automation engine may send similar information about the location of the one or more facts to the fact collector including but not limited to a fact class name, a fact instance name, and a slot name. At decision block 1513, the fact collector may determine if the one or more needed facts was found by the fact collector.

The fact collector may recognize organizational patterns of the one or more raw facts in an alternate fact source such as but not limited to a datastream, a file, a network connection, and a device telemetry stream. Patterns may be recognized in the alternate fact source by searching for recurring blocks of facts that have similar components. For example, in a file, a line may contain one or more raw facts such as but not limited to: /sbus@f,/SUNW,fdtwo@f, "fd". The one or more raw facts may have a pattern comprising a device path, an instance number, and a driver name. The one or more raw facts may be read from the file and organized into a table, such as but not limited to a spreadsheet or Relational Database Management System table (RDBMS), to represent a specific type of fact block. The columns of the table may be the components of the specific facts block. The one or more facts from the datastream may be a collection of these tables. The tables may represent classes and the individual fact entries in each table may be organized facts in fact slots for use by the knowledge automation engine. In one embodiment of the invention, the one or more facts may be stored to an Explorer tar file after being parsed into the fact slots. If the one or more needed facts was found by the fact collector, at block 1515, the one or more needed facts may be organized into a standard format recognizable by the knowledge automation engine. If the fact collector finds several facts matching the information about a particular needed fact, the fact collector may compare the several facts for consistency. The fact collector may send the first fact meeting the information about the particular needed fact to the knowledge automation engine. In one embodiment, the fact collector may send one of the other facts received in addition to or instead of the first fact found as described by the information sent by the knowledge automation engine. At block 1517, the one or more needed facts may be sent to the knowledge automation engine. At block 1519, the one or more needed facts may be sent to the fact repository.

In various embodiments, a check may include one or more rules and reference one or more product check matrixes of facts, such as, but not limited to, identifiers for product packages and patches, to be used by the check. In some embodiments, a check may be a wrapper for a knowledge class that includes facts (packages and patches) and logic (class rules related to the packages and patches). In some embodiments, class facts may be accessed from a knowledge facts database. The class facts may be organized in product check matrixes. In some embodiments, as packages and/or patches become available for a product, they may be manually added to a product check matrix for the product. In some embodiments, the packages and patches may be automatically added to the product check matrix. For example, the packages and patches may be added to the product check matrix using predefined associations. The product check matrix may be used to update packages and/or patches (including adding new packages/patches and removing old packages/patches) on a product. For example, a knowledge automation engine may evaluate a rule from a check to determine if a latest software version has been installed on a product. If not, a knowledge automation engine may access the product check matrix for the product and apply the relevant packages and/or patches. In some embodiments, a product check matrix may include other information including, but not limited to, problem statements, reference documents, and corresponding product information. The additional stored information may be used in constructing a corresponding check for the product check matrix. In some embodiments, facts for the product check matrix may be stored on an knowledge facts database accessible by the knowledge automation engine.

In some embodiments, associations may be defined between packages and patches in the knowledge facts database. For example, if a patch is added to a patch database as an update or revision to a package used by a product check matrix, an association may be defined between the package and corresponding patch. In addition, if an old patch is removed (e.g., replaced with a new patch), the old patch identification may be disassociated from the affected package in the product check matrix. The association may be noted and used in the product check matrixes that use the affected package. For example, if a package with an association to a new patch is used by the check/product check matrix, the patch may be used with the corresponding package. In addition, if the patch is updated or changed, the association may allow the product check matrix to update the associated patch. Associations may be created by a user separate from creating a product check matrix. In some embodiments, the association may be created with information including a package name, version or revision applied, severity level, and a description of the package. Other information may be added to the association. In some embodiments, the associations may be defined separate from the product check matrix and be used by multiple product check matrixes. In some embodiments, the associations may be defined with a particular product check matrix.

Figure 16:
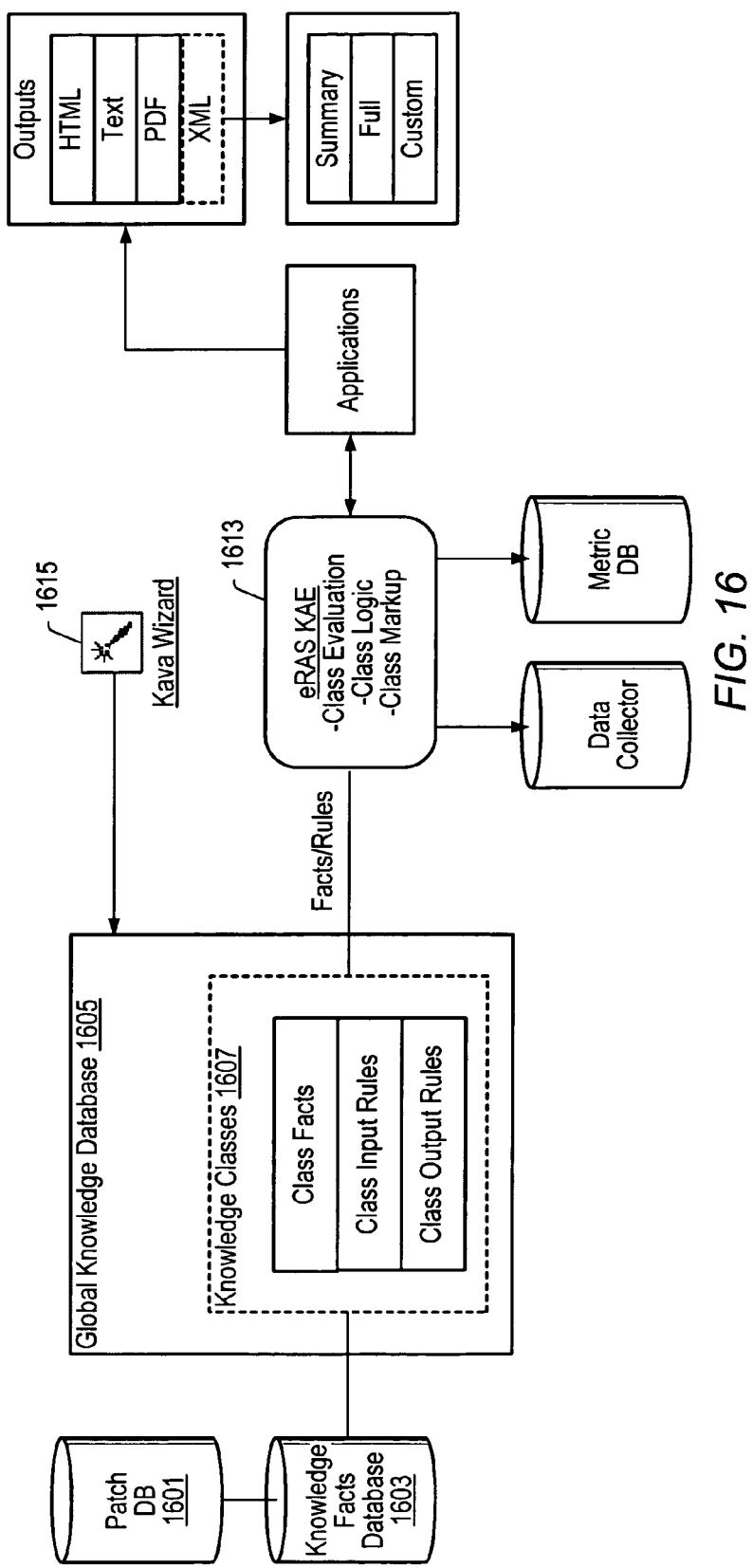
FIG. 16 shows an embodiment of the knowledge automation engine and a global knowledge database.

FIG. 16 shows an embodiment of the knowledge automation engine and a global knowledge database. In some embodiments, the knowledge automation engine 1613 may use checks and facts from the global knowledge database 1605. In some embodiments, a check may be a wrapper for a knowledge class 1607 that includes facts (packages and patches) and logic (class rules related to the packages and patches). In some embodiments, class facts may be accessed from a knowledge facts database. The class facts may be organized in product check matrixes. In addition, other databases, such as, but not limited to a patch database 1601 may be accessible by the global knowledge database 1605. In some embodiments, a wizard 1615 or other software program may be used to define facts and rules for the global knowledge database 1605. In some embodiments, associations may be made using the wizard and the associations may also be stored in the knowledge facts database. In some embodiments, associations may be automatically made based on other information known about packages and patches. For example, if a revision patch is applied to a package or patch in the package or patch database the revision patch may be associated with that package or patch in the product check matrixes that use that package or patch.

Figure 17:
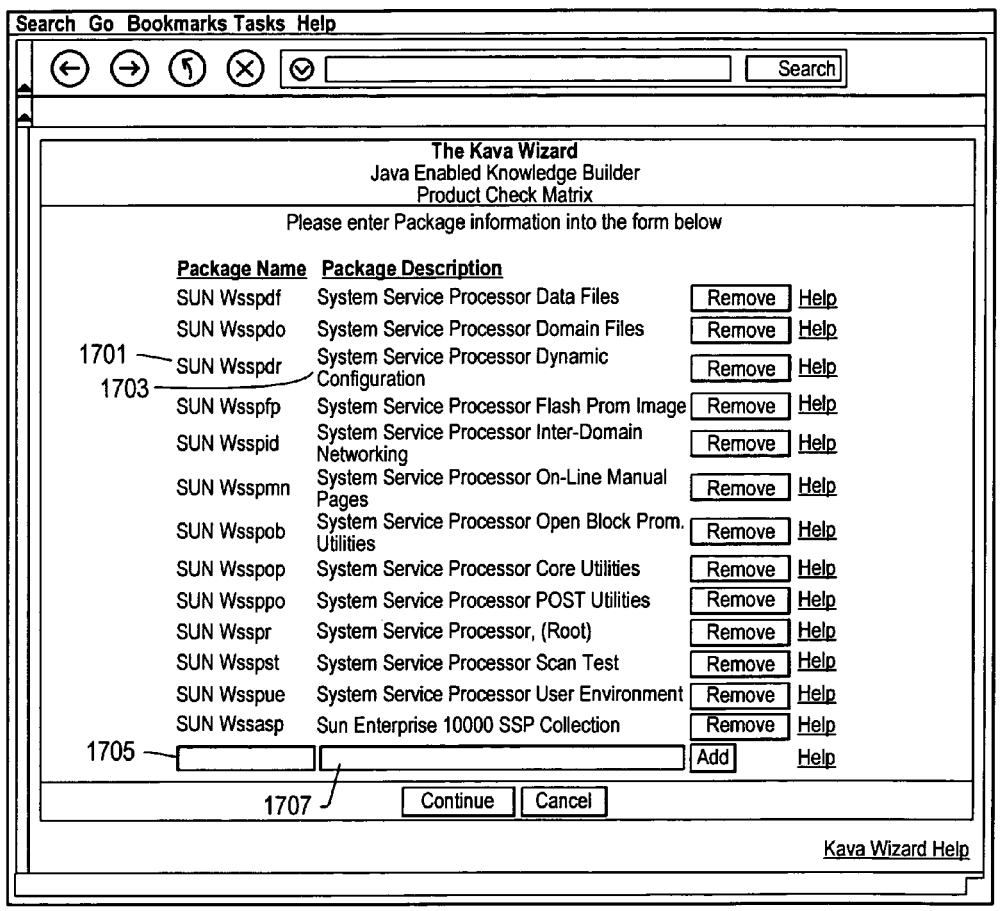
FIG. 17 shows an embodiment of a screen for listing packages or patches in a product check matrix using a wizard.

FIG. 17 shows an embodiment of a screen for listing packages or patches in a product check matrix using a wizard. In some embodiments, a package name, such as package name 1701, and a package description, such as package description 1703, may be added to a product check matrix. In some embodiments, only the package name may be added. In various embodiments, package names may be added at window 1705 and package descriptions may be added at 1707. Other methods for entering package names and descriptions are also contemplated. In addition, in some embodiments, patch names and descriptions may be added to the product check matrix. Once the product check matrix has the package names, it may be used in conjunction with a check.

Figure 18:
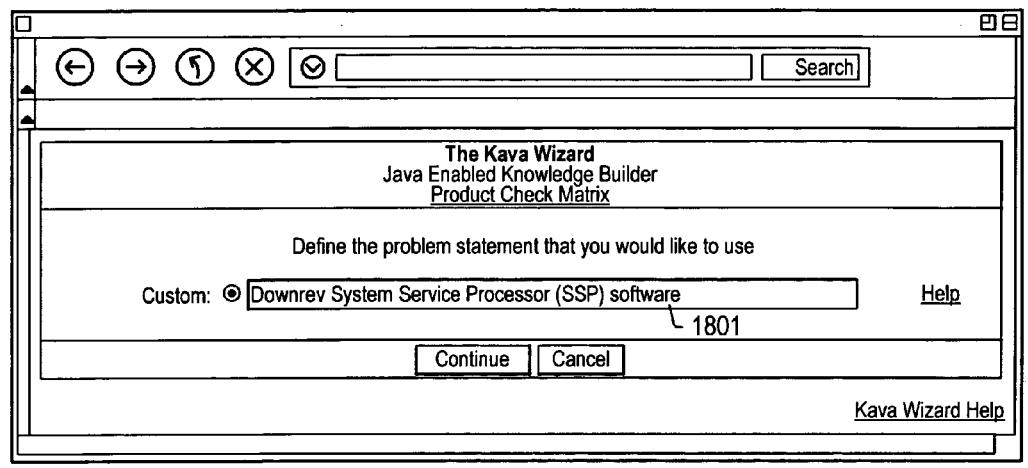
FIG. 18 shows an embodiment of a screen for defining a problem statement for a product check matrix.

FIG. 18 shows an embodiment of a screen for defining a problem statement for a product check matrix. In some embodiments, the product check matrix may include other information. The problem statement may be used by checks accessing the product check matrix. In some embodiments, the problem statement and other information needed for a check may be entered with other information entered for the product check matrix. A check may be defined by the entered information. In some embodiments, the check may be created separate from the product check matrix.

Figure 19:
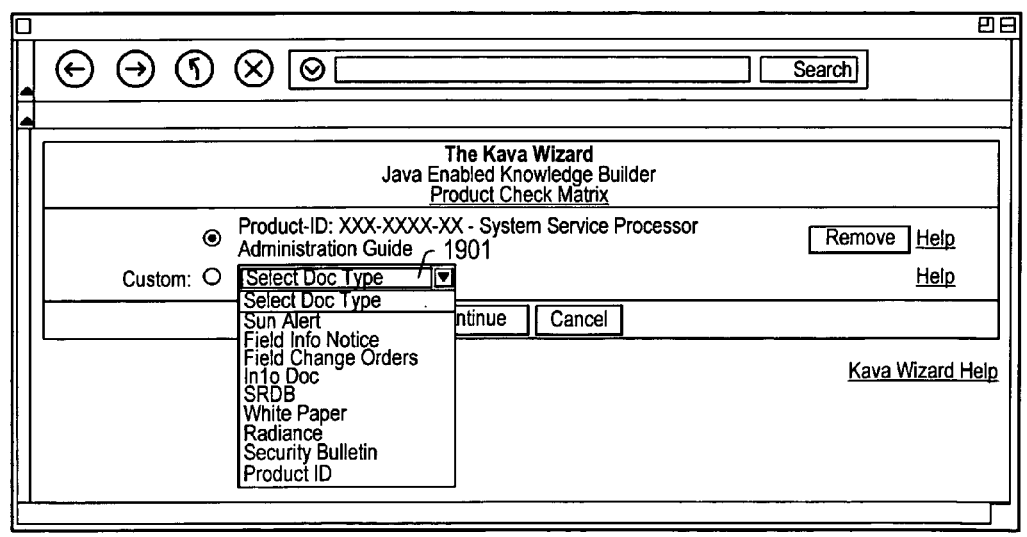
FIG. 19 shows an embodiment of a screen for adding reference documentation to a product check matrix.

FIG. 19 shows an embodiment of a screen for adding reference documentation to a product check matrix. In some embodiments, the product check matrix may include reference documents. For example, a user may select a reference document type 1901 to add to the product check matrix before giving the location of the reference documentation, a document description, and/or document number. If the check uses a package or patch from the product check matrix, the user may be given information on the related reference documents. For example, the reference documents may provide information about the applied package or patch.

Figure 20:
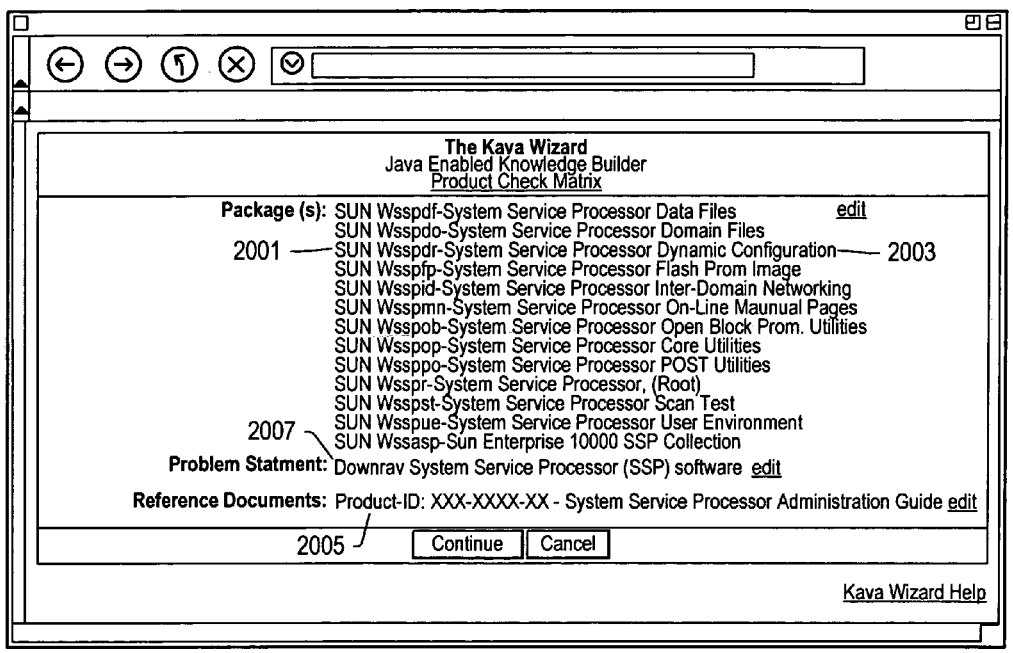
FIG. 20 shows an embodiment of a screen with an example of a product check matrix.

FIG. 20 shows an embodiment of a screen with an example of a product check matrix. In some embodiments, the product check matrix may include package names 2001, package descriptions 2003, a problem statement 2007, and reference documentation 2005. Other product check matrix components are also contemplated. In some embodiments, when the product check matrix is created, a corresponding check may be created (which may include the problem statement and reference documentation). In some embodiments, the check may be created separate from the product check matrix.

Figure 21:
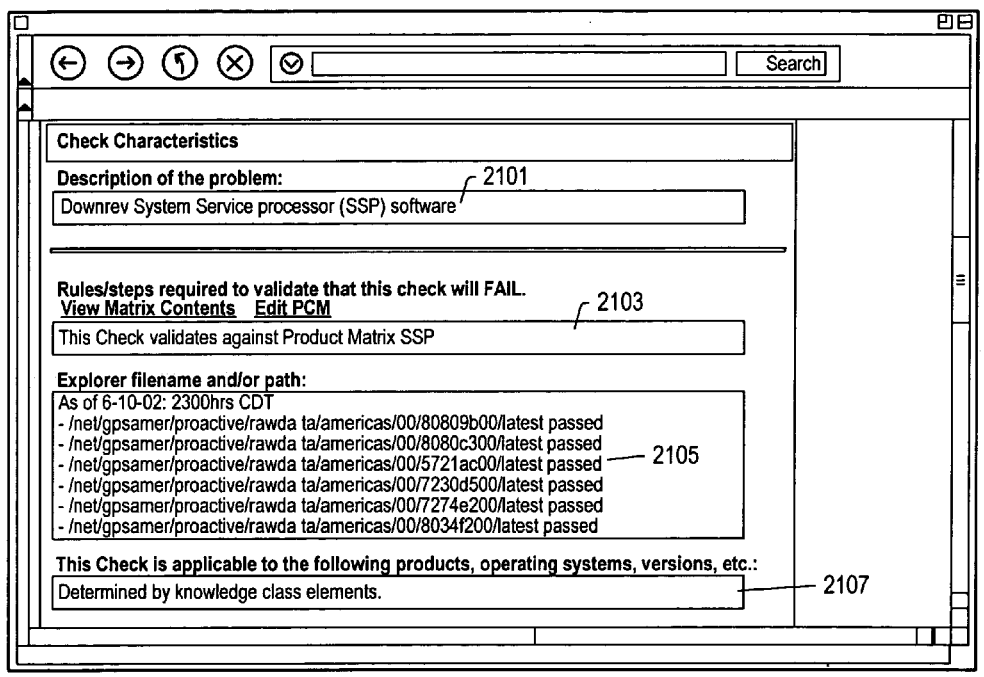
FIG. 21 shows an embodiment of a screen with additional check elements.

FIG. 21 shows an embodiment of a screen with additional check elements. In some embodiments, other elements may be added to the check after it is created with the product check matrix. In some embodiments, additional check elements may be added with the creation of the product check matrix. For example, problem description 2101, check rule 2103, explorer filename 2105, and corresponding products 2107 may be added as additional information.

Figure 22:
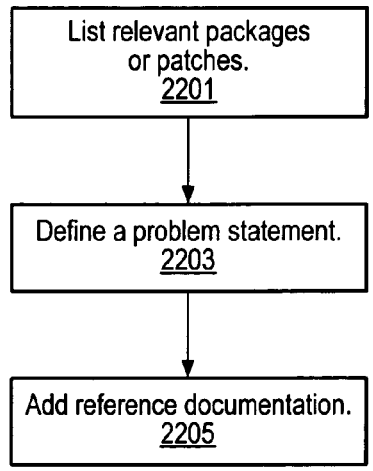
FIG. 22 shows a flowchart of an embodiment of a method for creating a product check matrix.

FIG. 22 shows a flowchart of an embodiment of a method for creating a product check matrix. In some embodiments, a product check matrix may be created to define which packages and patches are needed for a particular product.

At 2201, a user may list relevant packages or patches. For example, all of the needed packages for a product may be listed together in a product check matrix. In some embodiments, the product check matrix may include a list of patches to apply. Product check matrixes with patches listed may be applied to packages or products. In some embodiments the packages and patches may be used to correct problems on products or be used to enhance certain functionalities of the product.

At 2203, a user may define a problem statement. In some embodiments, the problem statement may be defined with the product check matrix. In some embodiments, the problem statement may be defined separately in a check that may use a product check matrix. In some embodiments, the problem statement may provide information about what the packages and patches are used for (e.g., install a product, fix a product, enhance a product, etc.).

At 2205, a user may add reference documentation. In some embodiments, the reference documentation (including information for how to locate the reference documentation) may be listed with the product check matrix. In some embodiments, the reference documentation may be listed separately with a separately created check. In some embodiments, reference documentation may not be included with the product check matrix or check.

Figure 23:
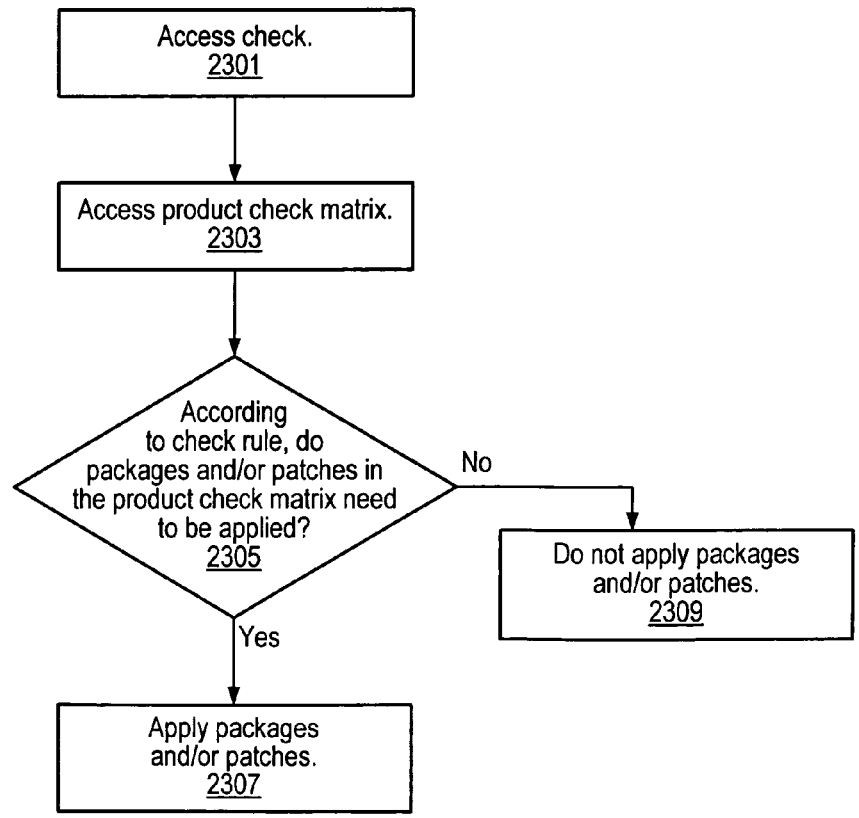
FIG. 23 shows a flowchart of an embodiment of a method for applying a product check matrix.

FIG. 23 shows a flowchart of an embodiment of a method for applying a product check matrix. In some embodiments, a knowledge automation engine may evaluate a rule in a check to determine if package and/or patches in a product check matrix need to be applied to the product.

At 2301, a check may be accessed. In some embodiments, the check may be accessed from the global knowledge engine. A check may be selected based on the type of product a knowledge automation engine is analyzing. In some embodiments, a check may be selected based on the type of problem a product is experiencing. In some embodiments, a check may be selected based on a type of update needed by a product. Other reasons for selecting a check are also contemplated.

At 2303, a product check matrix may be accessed. In some embodiments, a check may be selected and accessed that corresponds to the product check matrix. The product check matrix may list packages and/or patches related to a problem a check rule is designed to detect. In some embodiments, the knowledge automation engine may use a product check matrix to update or install a product on a system. Other reasons for accessing a product check matrix are also contemplated.

At 2305, the check rule may be analyzed for a current product to determine if the packages and/or patches in the product check matrix need to be applied. In some embodiments, a fact about a product may be retrieved from a fact repository to evaluate the rule against. In some embodiments, the check rule may be designed to detect a problem with a product or detect if a product needs to be installed or updated. Other check rules are also contemplated.

At 2307, if the packages and/or patches in the product check matrix need to be applied, the packages and/or patches may be applied. In some embodiments, patches may be associated with various packages in the product check matrix. If these packages are applied, the relevant patches may also be applied. If patches that are associated with packages in the product check matrix change or are replaced in a patch database, a patch identification in the product check matrix associated with the corresponding package may also be changed in the product check matrix.

At 2309, if the packages and/or patches in the product check matrix do not need to be applied, the packages and patches may not be applied.

Figure 24:
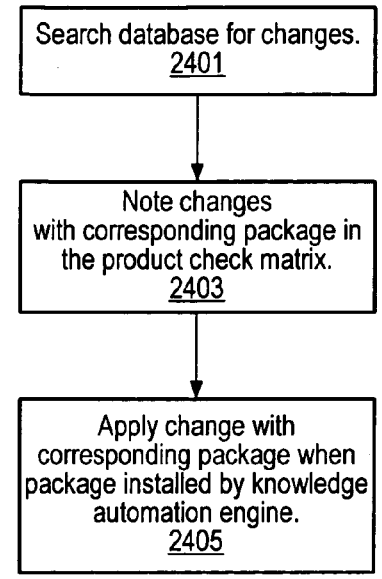
FIG. 24 shows a flowchart of an embodiment of a method for automating a product check matrix.

FIG. 24 shows a flowchart of an embodiment of a method for automating a product check matrix. In various embodiments, as changes are applied to packages and/or patches listed in a product check matrix, the entries in the product check matrix may be updated with these changes.

At 2401, a database may be searched for changes. For example, a patch database may be searched to see if any patches have been added, changed, or removed for packages in a product check matrix. In some embodiments, a product check matrix may list primarily patches and patches that have been added, changed, or removed may be updated in the product check matrix.

At 2403, the detected changes may be noted with a corresponding package in the product check matrix. For example, information for a corresponding patch may be listed in association with a package in the product check matrix. In some embodiments, the updates may be listed separate from the product check matrix.

At 2405, the changes may be applied with the corresponding package when the package is installed by a knowledge automation engine. In some embodiments, the product check matrix may primarily list patches in which case the updated patch may be applied.

Various embodiments may further include receiving, sending, or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or wireless link.

Note that the flow charts described herein represent exemplary embodiments of methods. The methods may be implemented in software, hardware, or a combination thereof. The order of method may be changed, and various elements may be added, reordered, combined, omitted or modified.

Specific embodiments of the invention may only be examples. Other embodiments of the invention may be performed in different application environments using different methods and programming languages.

Various modifications and changes may be made to the invention as would be obvious to a person skilled in the art having the benefit of this disclosure. It is intended that that the following claims be interpreted to embrace all such modifications and changes and, accordingly, the specifications and drawings are to be regarded in an illustrative rather than a restrictive sense.

We claim:

1. A system, comprising:
a processor;
a memory coupled to the processor and configured to store program instructions executable by the processor to implement:
a knowledge automation engine comprising:
a knowledge interface to receive one or more checks and one or more corresponding product check matrixes from a knowledge repository, wherein the one or more corresponding product check matrixes specify one or more of packages or patches applicable to one or more product issues;
a fact interface to receive one or more facts describing a product configuration;
wherein the knowledge automation engine automatically evaluates a rule in the one or more checks against the one or more facts to determine if the one or more product issues specified by the one or more checks exists for the product configuration;
wherein if the one or more product issues are detected, the knowledge automation engine applies one or more of packages or patches specified in the one or more corresponding product check matrixes to correct the one or more product issues;
wherein the one or more of packages or patches specified by the one or more product check matrixes comprises:
a package; and
a patch associated with the package; and
wherein if the patch associated with the package is updated with a new patch in a database accessible by the knowledge automation engine, the association with the package is updated with the new patch.

2. The system as recited in claim 1, wherein the association between the package and the patch is predefined.

3. The system as recited in claim 1, wherein the one or more of packages or patches specified in the one or more product check matrixes are stored in a separate database than the one or more product check matrixes.

4. The system of claim 1, wherein a product check matrix of the one or more product check matrixes specifies one or more of packages or patches directly applicable to a specific product issue detectable by executing the rule of a check associated with the corresponding product check matrixes.

5. The system of claim 4, wherein the one or more product check matrixes further comprises a problem statement corresponding to the specific product issue.

6. The system of claim 5, wherein the one or more product check matrixes further comprises a link to reference documentation corresponding to the specific product issue.

7. The system of claim 5, wherein the one or more product check matrixes are included in a single file.

8. The system of claim 1,
wherein the one or more corresponding product check matrixes comprise two or more product check matrixes each specifying different patches, than the other product check matrixes, for different respective product issues of the one or more product issues;
wherein the one or more checks comprise two or more checks and wherein the two or more product check matrixes correspond to different respective checks of the two or more checks;
wherein a specific check of the two or more checks comprise a rule to detect the specific product issue corresponding to a specific product check matrix of the two or more product check matrixes; and
wherein upon detecting the specific product issue, the specified patch, for the specific product issue, from the corresponding product check matrix is applied to correct the specific product issue.

9. A method, comprising:
listing one or more of packages or patches in a product check matrix, wherein the product check matrix corresponds to one or more product issues;
defining separate checks, each comprising one or more check elements related to the one or more product issues, wherein the one or more check elements includes a rule and wherein the one or more check elements are linked to the corresponding product check matrix with the one or more of packages or patches for correcting the one or more product issues; and
evaluating the rule against a fact to determine if the one or more product issues is present on a product;
wherein the one or more of packages or patches listed by the product check matrix includes at least a package and a patch associated with the package;
wherein the method further comprises defining one or more associations between the package in the product check matrix and the patch; and
wherein if the patch corresponding to the one or more associations is updated, the one or more associations are updated to indicate the updated patch.

10. The method of claim 9, further comprising applying the one or more of the packages or patches to the product specified in the corresponding product check matrix when the one or more product issues are discovered by evaluating the rule.

11. The method of claim 9, wherein the listing of one or more of packages or patches is specific to one product issue of the one or more product issues and is located in a single file.

12. The method as recited in claim 9,
wherein the one or more associations are defined according to patch updates applied to the package in a database accessible by a knowledge automation engine.

13. The method as recited in claim 12, further comprising disassociating the one or more associations formed between the package and the patch if the patch is replaced.

14. The method as recited in claim 9, wherein the one or more check elements are used with the corresponding product check matrix.

15. The method as recited in claim 9, wherein the one or more check elements are selected from the rule, a problem statement, or a link to reference documentation.

16. A system, comprising:
a processor;
a memory coupled to the processor and configured to store program instructions executable by the processor to:
receive a listing of one or more of packages or patches in a product check matrix of a plurality of product check matrixes, wherein the product check matrix corresponds to one or more product issues, and wherein the plurality of product check matrixes comprises two or more product check matrixes that correspond to different product issues and have listings of one or more of packages or patches specific to their respective product issue;

receive a definition of one or more check elements related to the one or more product issues of the product check matrix of the plurality of product check matrixes, wherein the one or more check elements includes a rule and wherein the one or more check elements are linked to the corresponding product check matrix with the one or more of packages or patches for correcting the one or more product issues;

evaluate the rule against a fact to determine if the one or more product issues is present on a product; and wherein the listing of one or more of packages or patches is specific to one product issue of the one or more product issues and is located in a single file.

17. The system as recited in claim 16, wherein the program instructions are further executable to retrieve the fact from a fact repository about the product.

18. The system of claim 16, wherein the program instructions are further executable to apply the one or more of the packages or patches to the product specified in the corresponding product check matrix when the one or more product issues are discovered by evaluating the rule.

19. The system as recited in claim 16,
wherein the one or more of packages or patches listed by the product check matrix includes at least a package and a patch associated with the package; and
wherein the program instructions are further executable to define one or more associations between the package in the product check matrix and the patch.

20. The system as recited in claim 19, wherein if the patch corresponding to the one or more associations is updated, the one or more associations are updated to indicate the updated patch.

21. The system as recited in claim 16,
wherein the one or more of packages or patches listed by the product check matrix includes at least a package and a patch associated with the package;
wherein the program instructions are further executable to define one or more associations between the package and the patch in the product check matrix; and
wherein the one or more associations are defined according to patch updates applied to the package in a database accessible by a knowledge automation engine.

22. The system as recited in claim 21, wherein the program instructions are further executable to disassociate the one or more associations formed between the package and the patch if the patch is replaced.

23. The system as recited in claim 16, wherein the one or more check elements are defined in a separate check.

24. The system as recited in claim 16, wherein the one or more check elements are used with the corresponding product check matrix.

25. The system as recited in claim 16, wherein the one or more check elements are selected from the rule, a problem statement, or a link to reference documentation.

26. A method, comprising:
receiving a check from a knowledge repository, wherein the check comprises a rule for detecting a specific product issue;
receiving a fact describing a product configuration;
evaluating the rule against the fact to determine if the specific product issue exists for the product configuration;
applying a package listed in a product check matrix to correct the specific product issue, wherein the product check matrix is associated with the check and the specific product issue and is selectively accessed from a plurality of product check matrixes to determine a package to use to correct the specific product issue; and
wherein the plurality of product check matrixes comprises two or more product check matrixes that correspond to different product issues and have listings of one or more of packages or patches specific to their respective product issue.

27. The method of claim 26, further comprising automatically updating the product check matrix with a listing of an updated package.

28. The method of claim 26, wherein the product check matrix further comprises a problem statement and a link to reference documentation.

29. The method of claim 28, wherein the rule for the check corresponds to the problem statement in the corresponding product check matrix.

30. The method of claim 26, further comprising automatically updating the product check matrix with a listing for a patch corresponding to the package.

31. The method of claim 26, further comprising receiving the corresponding product check matrix with the check.

32. A system, comprising:
a processor;
a memory coupled to the processor and configured to store program instructions executable by the processor to:
receive a check from a knowledge repository, wherein the check comprises a rule for detecting a specific product issue;
receive a fact describing a product configuration;
evaluate the rule against the fact to determine if the specific product issue exists for the product configuration;
apply a package listed in a product check matrix to correct the specific product issue, wherein the product check matrix is associated with the check and the specific product issue and is selectively accessed from a plurality of product check matrixes to determine a package to use to correct the specific product issue; and
automatically update the product check matrix with a listing for a patch corresponding to the package;
wherein the plurality of product check matrixes comprises two or more product check matrixes that correspond to different product issues and have listings of one or more of packages or patches specific to their respective product issue.

33. The system of claim 32, wherein the program instructions are further executable to automatically update the product check matrix with a listing of an updated package.

34. The system of claim 32, wherein the program instructions are further executable to receive the corresponding product check matrix with the check.

* * * * *

UNITED STATES PATENT AND TRADEMARK OFFICE
CERTIFICATE OF CORRECTION

PATENT NO. : 7,475,293 B1
APPLICATION NO. : 10/691894
DATED : January 6, 2009
INVENTOR(S) : Mike E. Little et al.

It is certified that error appears in the above-identified patent and that said Letters Patent is hereby corrected as shown below:

On The Title Page Item [63]:

Under "Related U.S. Application Data", line 5 please delete "application No. 10/591,894,".

Signed and Sealed this
Twenty-sixth Day of July, 2011

David J. Kappos
*Director of the United States Patent and Trademark Office*